(12) United States Patent
Konishi et al.

(10) Patent No.: US 11,673,172 B2
(45) Date of Patent: Jun. 13, 2023

(54) METHOD AND SYSTEM FOR RECOVERING PULP FIBERS FROM USED ABSORBENT ARTICLES

(71) Applicant: Unicharm Corporation, Ehime (JP)

(72) Inventors: Takayoshi Konishi, Kanonji (JP); Toshio Hiraoka, Kanonji (JP); Takashi Kato, Kanonji (JP); Noritomo Kurita, Kanonji (JP)

(73) Assignee: UNICHARM CORPORATION, Ehime (JP)

( * ) Notice: Subject to any disclaimer, the term of this patent is extended or adjusted under 35 U.S.C. 154(b) by 0 days.

(21) Appl. No.: 16/760,107

(22) PCT Filed: Jul. 26, 2018

(86) PCT No.: PCT/JP2018/028145
§ 371 (c)(1),
(2) Date: Apr. 29, 2020

(87) PCT Pub. No.: WO2019/087486
PCT Pub. Date: May 9, 2019

(65) Prior Publication Data
US 2020/0346261 A1    Nov. 5, 2020

(30) Foreign Application Priority Data

Nov. 1, 2017  (JP) .............................. JP2017-212276
Jun. 1, 2018  (JP) .............................. JP2018-106406

(51) Int. Cl.
*B02C 4/08*       (2006.01)
*B09B 3/00*       (2022.01)
(Continued)

(52) U.S. Cl.
CPC .................. *B09B 3/00* (2013.01); *B02C 4/08* (2013.01); *B02C 23/36* (2013.01); *D21B 1/021* (2013.01); *D21B 1/026* (2013.01); *D21B 1/345* (2013.01)

(58) Field of Classification Search
CPC ......... D21B 1/021; D21B 1/026; D21B 1/345
See application file for complete search history.

(56) References Cited

U.S. PATENT DOCUMENTS 5,558,745 A     9/1996 Conway et al.
2016/0001296 A1 1/2016 Scaife
(Continued)

FOREIGN PATENT DOCUMENTS

CN  103418605 A  12/2013
CN  106115026 A  11/2016
(Continued)

OTHER PUBLICATIONS

European Application No. EP18874188.8, Extended European Search Report dated Dec. 1, 2020, 7 pages.
(Continued)

*Primary Examiner* — Jacob T Minskey
(74) *Attorney, Agent, or Firm* — Fredrikson & Byron, P.A.

(57) ABSTRACT

Provided is a method that, when pulp fibers are recovered from used absorbent articles that have been put into collection bags, makes it possible to safely and sanitarily crush the used absorbent articles while suppressing costs. A method for recovering pulp fibers from used absorbent articles, the method comprising: a crushing step (S12) in which collection bags (A) in which used absorbent articles have been sealed are put into a container (65), the collection bags in the container are transferred to a crushing device (12) that communicates with the container, and, bag by bag, the
(Continued)

crushing device crushes the used absorbent articles in the collections bags in a deactivating aqueous solution; and a separation step (S13) in which the pulp fibers, a highly water-absorbent polymer, and the deactivating aqueous solution are separated from the crushed product and deactivating aqueous solution obtained in the crushing step.

11 Claims, 9 Drawing Sheets

(51) Int. Cl.
   *B02C 23/36* (2006.01)
   *D21B 1/02* (2006.01)
   *D21B 1/34* (2006.01)

(56) References Cited

U.S. PATENT DOCUMENTS

| | | | |
|---|---|---|---|
| 2016/0060028 A1* | 3/2016 | McConnell | G09B 19/00 356/244 |
| 2017/0107667 A1 | 4/2017 | Konishi et al. | |

FOREIGN PATENT DOCUMENTS

| | | |
|---|---|---|
| EP | 3156541 A1 | 4/2017 |
| JP | 2001310178 A | 11/2001 |
| JP | 3096152 U | 9/2003 |
| JP | 20067111 A | 1/2006 |
| JP | 3139358 U | 2/2008 |
| JP | 2016514043 A | 5/2016 |
| JP | 106861853 A | 6/2017 |
| RU | 2112096 C1 | 5/1998 |
| WO | 2015190140 A1 | 12/2015 |

OTHER PUBLICATIONS

PCT International Search Report dated Sep. 18, 2018 for Intl. App. No. PCT/JP2018/028145, from which the instant application is based, 2 pgs.

English Abstract and Machine Translation for Japanese Publication No. 3139358 U, published Feb. 14, 2008, 18 pgs.

English Abstract and Machine Translation for Japanese Publication No. 3096152 U, published Sep. 5, 2003, 21 pgs.

English Abstract and Machine Translation for Japanese Publication No. 2006-007111 A, published Jan. 12, 2006, 56 pgs.

English Abstract and Machine Translation for Japanese Publication No. 2001-310178 A, published Nov. 6, 2001, 30 pgs.

English Abstract and Machine Translation for Japanese Publication No. 2016-514043 A, published May 19, 2016, 2 pgs.

English Abstract and Machine Translation for Chinese Publication No. 106861853 A, published Jun. 20, 2017, 7 pgs.

English Abstract and Machine Translation for Chinese Publication No. CN 103418605 A, published Dec. 4, 2013, 14 pgs.

English Abstract and Machine Translation for Chinese Publication No. CN 106115026 A, published Nov. 16, 2016, 9 pgs.

* cited by examiner

METHOD AND SYSTEM FOR RECOVERING PULP FIBERS FROM USED ABSORBENT ARTICLES

RELATED APPLICATIONS

This application is a 35 U.S.C. 371 national phase filing from International Application No. PCT/JP2018/028145, filed Jul. 26, 2018, which claims priority to Japanese Application No. 2018-106406, filed Jun. 1, 2018 and Japanese Application No. 2017-212276, filed Nov. 1, 2017, the contents of which are incorporated herein by reference.

FIELD

The present invention relates to a method and a system of recovering pulp fibers from a used absorbent article.

BACKGROUND

A method of recovering pulp fibers from a used absorbent article such as a disposable diaper is known. In such a method, when processing the used absorbent article, it is important to suppress the cost by improving the recovery rate of pulp fibers and improving the processing efficiency, and to improve the hygiene management by reducing the scattering of dirt from the disposable diapers. Accordingly, there may be cases where a collection bag enclosing a plurality of used absorbent articles is processed as it is. By processing the collection bag as it is, the work of extracting the used absorbent article from the collection bag, etc., can be reduced (the improvement of the processing efficiency), and it is difficult for dirt and fungi attached to the used absorbent article to come into contact with the workers (the improvement of the hygiene management).

As such as method, for example, a crushing-separation-recovery device for used diapers is disclosed for example in Non-Patent Literature 1. This device is configured by a separation tank, a screen, a mixing machine, a crushing means, a pulp, etc., discharging means, and a plastic, etc., discharging means. Into the separation tank, the used diapers which are put into a collection body (bag) is thrown together with the collection body, and further, water, polymer separation agent and sterilization/disinfection agent are supplied. The screen partitions the separation tank into the upper room and the lower room. The mixing machine is provided in the upper room of the separation tank and mixes the processed matter (the collection bag, the used diapers, water, various agents, etc.). The crushing means is provided in the upper room of the separation tank and can crush the collection body and the used diapers. The pulp, etc., discharging means is provided so as to be connected to the lower room of the separation tank and discharges the pulp, etc., which has passed through the screen. The plastic, etc., discharging means is provided so as to be connected to the upper room of the separation tank and discharges the plastic, etc., which cannot pass through the screen under the natural flow. According to Non-Patent Literature 1, in the conventional art, a crushing facility other than a separation-recovery facility was necessary, and since diapers in a state in which excrement is attached is simply crushed during the crushing processing, whereby there was a heavy burden from the hygiene perspective, however, it is conceived that this device can solve the issues of the cost and the hygiene management.

CITATION LIST

Patent Literature

[Non-PTL 1] Utility model registration publication No. 3139358

SUMMARY

Technical Problem

The device disclosed in Non-Patent Literature 1 integrates the crushing device and the separation device into a single device, and while mixing the water inside the separation tank, the collection bag is ruptured and the used diapers are crushed by the same crushing means in the water thereof. Accordingly, such water is to be in a state in which not only the crushed used diapers but also dirt and fungi of the used diapers are mixed, whereby there may be cases in which the dirt and fungi are scattered to the outside from the water surface and odor accompanied by the dirt are released. Then, in some cases, it may be conceived that workers of the device come into contact with the dirt and fungi directly or indirectly during the processing or maintenance, or are exposed to the odor. It is desired that when recovering pulp fibers from used absorbent articles which are put into a collection bag, while suppressing the cost, technique by which the used absorbent articles can be crushed hygienically and safely is achieved.

The object of the present invention is to provide a method and a system which can crush used absorbent articles hygienically and safely, while suppressing the cost, when recovering pulp fibers from the used absorbent articles which are put into a collection bag.

Solution to Problem

The method of recovering pulp fibers from a used absorbent article which includes pulp fibers and superabsorbent polymers according to the present invention is as follows. (1) A method of recovering pulp fibers from a used absorbent article which includes pulp fibers and superabsorbent polymers, the method comprising: a reception process of putting a collection bag enclosing the used absorbent article into a container; a crushing process of, while transferring the collection bag inside the container to a crushing device which is connected to the container, crushing the used absorbent article inside the collection bag together with the collection bag within an inactivation aqueous solution by the crushing device; and a separation process of separating the pulp fibers, superabsorbent polymers, and the inactivation aqueous solution by a separation device from crushed matter and the inactivation aqueous solution which are obtained by the crushing process.

According to the present method, at least after the collection bag is received by the container, while transferring the collection bag to the crushing device which is provided separately from the container, in the crushing device, the used absorbent article is crushed together with the collection bag while inactivating the superabsorbent polymers of the used absorbent article inside the collection bag, within the inactivation aqueous solution. That is, when used absorbent articles are crushed, the used absorbent articles are crushed inside the crushing device which is separate from the container, within the inactivation aqueous solution, and after the crushing, the inactivation aqueous solution and the crushed matter are transferred to the separation device.

Accordingly, even when dirt or fungi is mixed into the inactivation aqueous solution, or odor is produced, the inactivation aqueous solution and the crushed matter into which dirt or fungi is mixed hardly reach the container. Therefore, the crushing can be performed without dirt or fungi hardly remaining in the container. In addition, since odor can be sealed by the inactivation aqueous solution, the production of odor can also be suppressed to a lower degree. Especially, when the crushing is performed within the inactivation aqueous solution, alkaline volatile components which derive from excrement such as urine, etc., remain within the inactivation aqueous solution without volatilizing, whereby production of odor by alkaline gas such as ammonia, etc., can be suppressed. Accordingly, when crushing used absorbent articles, dirt and fungi can be suppressed from being scattered and odor accompanied therewith can be suppressed from being released. That is, used absorbent articles can be crushed hygienically and safely, and the cost of hygiene management during processing or maintenance can be suppressed.

The present method may be (2) the method according to the above-mentioned (1), wherein the reception process includes a hole punching process of punching a hole in a surface of the collection bag which comes into contact with the inactivation aqueous solution, after putting the collection bag into a solution tank as the container in which the inactivation aqueous solution is stored, and the crushing process includes a process of, while transferring the collection bag with the hole, sunk under a water surface of the inactivation aqueous solution from the solution tank to the crushing device together with the inactivation aqueous solution, crushing the used absorbent article inside the collection bag together with the collection bag within the inactivation aqueous solution.

According to the present method, at least a hole is punched in the collection bag, whereby the inactivation aqueous solution is introduced into the collection bag from the hole, so as to inactivate the superabsorbent polymers which are included in the used absorbent articles by the inactivation aqueous solution, and the collection bag is substantially sunk under the water surface of the inactivation aqueous solution. Accordingly, while transferring the collection bag which is sunk under the water surface of the inactivation aqueous solution from the solution tank together with the inactivation aqueous solution, the used absorbent articles can be crushed together with the collection bag within the inactivation aqueous solution. Therefore, dirt and fungi are hardly mixed into the inactivation aqueous solution and odor is hardly produced until the initiation of the crushing. Further, even if dirt and fungi are mixed into the inactivation aqueous solution and odor is produced when the used absorbent articles are crushed, at almost the same time as the crushing, the inactivation aqueous solution into which the dirt and fungi are mixed is delivered from the solution tank together with the crushed matter, whereby the inactivation aqueous solution can be washed away with the dirt and fungi hardly remaining in the solution tank. In addition, since odor can be sealed by the inactivation aqueous solution, the production of odor can also be suppressed to a lower degree. Accordingly, when crushing used absorbent articles, dirt and fungi can be suppressed from being scattered and odor accompanied therewith can be suppressed from being released.

The present method may be (3) the method according to the above-mentioned (2), wherein the process of punching the hole in the collection bag in the hole punching process and the process of crushing the used absorbent article together with the collection bag in the crushing process are performed at different positions.

According to the present method, the process of punching a hole in the collection bag and the process of crushing the used absorbent articles together with the collection bag are performed at different (separate) portions (positions). Accordingly, the inactivation aqueous solution is introduced into the collection bag from the hole and the collection bag is reliably sunk under the water surface of the inactivation aqueous solution, and thereafter, the crushing can be performed at a different portion. Therefore, at the time of crushing, a situation can be suppressed in which a portion of the collection bag is exposed above the water surface of the inactivation aqueous solution, an opening (a rupture) is exposed above the water surface of the inactivation aqueous solution, and dirt and fungi of the used diapers are scattered and odor accompanied therewith is released.

The present method may be (4) the method according to the above-mentioned (2) or (3), wherein the crushing process includes: an in-solution crushing process of crushing the used absorbent article inside the collection bag together with the collection bag within the inactivation aqueous solution which is supplied together with the collection bag; and a withdrawal process of withdrawing the crushed matter which is obtained by the in-solution crushing process together with the inactivation aqueous solution from the in-solution crushing process.

According to the present method, the mixture of the crushed matter and the inactivation aqueous solution is actively withdrawn from the in-solution crushing process, whereby in accordance with the movement of the mixture, dirt of the equipment in relation to the in-solution crushing process can be removed (washed away) by the inactivation aqueous solution. Accordingly, the hygiene state can be preferably maintained in the crushing process.

The present method may be (5) the method according to any one of the above-mentioned (2) to (4), wherein the process of punching the hole in the surface of the collection bag which comes into contact with the inactivation aqueous solution in the hole punching process is performed by a protrusion which is capable of moving upward and downward in the solution tank while rotating around a rotation axis.

According to the present method, a hole is punched in the collection bag by a protrusion which moves upward and downward in the solution tank while rotating around a rotation axis. Accordingly, without having to let the collection bag sink within the inactivation aqueous solution, for example by letting the protrusion move to the upper portion of the solution tank so as to come into contact with the collection bag, a hole can be reliably punched in the collection bag. After punching a hole in the collection bag, the collection bag is sunk within the inactivation aqueous solution, whereby the collection bag can be reliably sunk within the acidic solution in a short amount of time, the processing time can be shortened, and the processing efficiency can be improved.

The present method may be (6) the method according to any one of the above-mentioned (2) to (4), wherein the process of punching the hole in the surface of the collection bag which comes into contact with the inactivation aqueous solution in the hole punching process is performed by delivering the collection bag into the inactivation aqueous solution from an upper portion of the solution tank and letting the collection bag come into contact with a protrusion which is arranged at a lower portion of the solution tank and rotates around a rotation axis.

According to the present method, the collection bag is delivered into the inactivation aqueous solution, and a hole is punched in the collection bag by the protrusion in the lower portion of the solution tank. After letting the collection bag sink within the inactivation aqueous solution, a hole is punched in the collection bag, whereby dirt and odor can be reliably prevented from spreading to the outside from the used absorbent articles inside the collection bag. Accordingly, the used absorbent articles can be crushed hygienically and safely.

The present method may be (7) the method according to the above-mentioned (1), wherein the crushing process includes a process of, while supplying the collection bag into the inactivation aqueous solution inside the crushing device, crushing the used absorbent article inside the collection bag together with the collection bag within the inactivation aqueous solution.

According to the present method, the inactivation aqueous solution is stored inside the crushing device in advance, and the used absorbent articles inside the collection bag are crushed together with the collection bag within the inactivation aqueous solution. Accordingly, the used absorbent articles inside the collection bag can be crushed together with the collection bag, reliably within the inactivation aqueous solution.

The present method may be (8) the method according to the above-mentioned (1) or (7), wherein the separation process includes a process of directly receiving the crushed matter and the inactivation aqueous solution by the separation device which is arranged directly under the crushing device.

According to the present method, the separation device is arranged directly under the crushing device, whereby the crushed matter which has been crushed by the crushing device and the inactivation aqueous solution can be quickly and reliably transferred to the separation device. Accordingly, even if dirt and fungi are mixed into the inactivation aqueous solution and odor is produced, the influence thereof can be suppressed to an even lower degree.

The present method may be (9) the method according to any one of the above-mentioned (1) to (8), wherein the crushing process includes a process of crushing the used absorbent article together with the collection bag so that an average value of a size of the crushed matter is 50 mm or larger and 100 mm or smaller.

According to the present method, in the crushing process, the used absorbent articles are crushed so that an average value of a size of the crushed matter is 50 mm or larger and 100 mm or smaller by the adjustment of the crushing device. Note that the size of the crushed matter is the length of the longer side in a case in which the shape is rectangular, is the diameter in a case in which the shape is a circle, and in a case in which the shape is irregular, is a length of one side of a square which corresponds to the area of such an irregular shape. In such a case, a slit can be reliably provided in the back sheet and/or the top sheet of each of the used absorbent articles, whereby substantially all pulp fibers can be extracted from the slit in each of the used absorbent articles. Accordingly, the recovery rate of the pulp fibers (the total amount of pulp fibers to be regenerated/the total amount of pulp fibers in the supplied used absorbent articles) and the recovery rate of the superabsorbent polymers can be improved. It should be noted however that when the average value of the size is set to less than 50 mm, materials other than the pulp fibers and the superabsorbent polymers (for example: films (such as the back sheet, etc.), nonwoven fabric (such as the top sheet, etc.), elastic bodies (such as rubbers for leakage prevention walls)) are cut into too small sizes, whereby it is difficult for such materials to be separated from the pulp fibers and the superabsorbent polymers. As a result, such materials which are mixed into the regenerated pulp fibers and the superabsorbent polymers increase, and the recovery rate of the pulp fibers and the superabsorbent polymers are to be reduced. On the other hand, when the average value of the size is set to be larger than 100 mm, it is difficult to apply a slit in the used absorbent articles. As a result, used absorbent articles from which pulp fibers and the superabsorbent polymers cannot be extracted occur, and the recovery rate of the pulp fibers and the superabsorbent polymers are to be reduced.

The present method may be (10) the method according to any one of the above-mentioned (1) to (9), wherein the process of crushing the used absorbent article together with the collection bag within the inactivation aqueous solution in the crushing process is performed by a biaxial crushing device.

According to the present method, the process of crushing the used absorbent articles is performed by using a biaxial crushing device (for example: a biaxial rotation-type crushing machine, a biaxial differential-type crushing machine, a biaxial shear-type crushing machine). Accordingly, the size of the crushed matter can be made roughly within the predetermined range. Therefore, a situation can be suppressed in which the crushed matter is too small and foreign matter is mixed into pulp fibers, or the crushed matter is too large and used absorbent articles from which pulp fibers cannot be extracted occur, whereby the recovery rate of pulp fibers are reduced.

The present method may be (11) the method according to any one of the above-mentioned (1) to (10), wherein the inactivation aqueous solution is an acidic aqueous solution.

According to the present method, the inactivation aqueous solution is an acidic aqueous solution, whereby the superabsorbent polymers in the used absorbent articles can be reliably dehydrated and inactivated. Especially, when the crushing is performed within an acidic aqueous solution, alkaline volatile components which derive from excrement such as urine, etc., remain within the acidic aqueous solution without volatilizing, whereby production of odor by alkaline gas such as ammonia, etc., can be suppressed. Accordingly, in the crushing process, the crushing can be performed easily without the used absorbent articles being greatly inflated, whereby the processing efficiency can be improved.

The present method may be (12) the method according to the above-mentioned (11), wherein the acidic aqueous solution includes a citric acid.

According to the present method, the acidic aqueous solution includes a citric acid (by for example: a concentration of 0.5 to 2.0 mass %), whereby the superabsorbent polymers in the used absorbent articles can be dehydrated and inactivated, and further, there is hardly a negative influence to the workers by acid, and corrosion of equipment in each process by acid can be suppressed.

The system of recovering pulp fibers from a used absorbent article which includes pulp fibers and superabsorbent polymers according to the present invention is as follows. (13) A system that is used for a method of recovering pulp fibers from a used absorbent article which includes pulp fibers and superabsorbent polymers, the system comprising: a container so as to put in a collection bag enclosing the used absorbent article; a crushing device which is connected to the container and crushes, while transferring the collection bag inside the container, the used absorbent article inside the collection bag together with the collection bag within an inactivation aqueous solution; and a separation device which separates the pulp fibers, superabsorbent polymers, and the inactivation aqueous solution from crushed matter and the inactivation aqueous solution which are obtained by the crushing device.

According to the present system, at least after the collection bag is received by the container, while transferring the collection bag to the crushing device which is provided separately from the container, in the crushing device, the used absorbent article is crushed together with the collection bag while inactivating the superabsorbent polymers of the used absorbent article inside the collection bag, within the inactivation aqueous solution. That is, when used absorbent articles are crushed, the used absorbent articles are crushed inside the crushing device which is separate from the container, within the inactivation aqueous solution, and after the crushing, the inactivation aqueous solution and the crushed matter are transferred to the separation device. Accordingly, even when dirt or fungi is mixed into the inactivation aqueous solution, or odor is produced, the inactivation aqueous solution and the crushed matter into which dirt or fungi is mixed hardly reach the container. Therefore, the crushing can be performed without dirt or fungi hardly remaining in the container. In addition, since odor can be sealed by the inactivation aqueous solution, the production of odor can also be suppressed to a lower degree. Especially, when the crushing is performed within the inactivation aqueous solution, alkaline volatile components which derive from excrement such as urine, etc., remain within the inactivation aqueous solution without volatilizing, whereby production of odor by alkaline gas such as ammonia, etc., can be suppressed. Accordingly, when crushing used absorbent articles, dirt and fungi can be suppressed from being scattered and odor accompanied therewith can be suppressed from being released. That is, used absorbent articles can be crushed hygienically and safely, and the cost of hygiene management during processing or maintenance can be suppressed.

The system may be (14) the system according to the above-mentioned (13), further comprising a rupturing device which includes: a solution tank as the container which stores the inactivation aqueous solution; and a hole punching portion which is provided inside the solution tank and when the collection bag is put into the solution tank, punches a hole in a surface of the collection bag which comes into contact with the inactivation aqueous solution, wherein the crushing device crushes, while transferring the collection bag with the hole, sunk under a water surface of the inactivation aqueous solution from the solution tank to the crushing device together with the inactivation aqueous solution, the used absorbent article inside the collection bag together with the collection bag within the inactivation aqueous solution.

According to the present system, at least a hole is punched in the collection bag, whereby the inactivation aqueous solution is introduced into the collection bag from the hole, so as to inactivate the superabsorbent polymers which are included in the used absorbent articles by the inactivation aqueous solution, and the collection bag is substantially sunk under the water surface of the inactivation aqueous solution. Accordingly, while transferring the collection bag which is sunk under the water surface of the inactivation aqueous solution from the solution tank together with the inactivation aqueous solution, the used absorbent articles can be crushed together with the collection bag within the inactivation aqueous solution. Therefore, dirt and fungi are hardly mixed into the inactivation aqueous solution and odor is hardly produced until the initiation of the crushing. Further, even if dirt and fungi are mixed into the inactivation aqueous solution and odor is produced when the used absorbent articles are crushed, at almost the same time as the crushing, the inactivation aqueous solution into which the dirt and fungi are mixed is delivered from the solution tank together with the crushed matter, the inactivation aqueous solution can be washed away with the dirt and fungi hardly remaining in the solution tank. In addition, since odor can be sealed by the inactivation aqueous solution, the production of odor can also be suppressed to a lower degree.

The system may be (15) the system according to the above-mentioned (14), wherein the rupturing device and the crushing device are different devices.

According to the present system, the rupturing device which punches a hole in the collection bag and the crushing device which crushes the used absorbent articles together with the collection bag are different devices. Accordingly, punching a hole and crushing the used absorbent articles can be reliably performed at separate portions (positions), whereby the inactivation aqueous solution is introduced into the collection bag from the hole and the collection bag is reliably sunk under the water surface of the inactivation aqueous solution, and thereafter, the crushing can be performed at a different portion. Therefore, at the time of crushing, a situation can be suppressed in which a portion of the collection bag is exposed above the water surface of the inactivation aqueous solution, an opening (a rupture) is exposed above the water surface of the inactivation aqueous solution, and dirt and fungi of the used diapers are scattered and odor accompanied therewith is released.

The system may be (16) the system according to the above-mentioned (14) or (15), wherein the crushing device includes a crushing portion which crushes the used absorbent article inside the collection bag together with the collection bag within the inactivation aqueous solution which is supplied together with the collection bag; and a pump which withdraws the crushed matter which is obtained by the crushing portion together with the inactivation aqueous solution from the crushing portion.

According to the present system, the mixture of the crushed matter and the inactivation aqueous solution is actively withdrawn from the crushing portion by the pump, whereby in accordance with the movement of the mixture, dirt of the crushing portion can be removed (washed away) by the inactivation aqueous solution. Accordingly, the hygiene state can be preferably maintained in the crushing device.

The system may be (17) the system according to any one of the above-mentioned (14) to (16), wherein the hole punching portion in the rupturing device includes a protrusion which is capable of moving upward and downward in the solution tank while rotating around a rotation axis.

According to the present system, a hole is punched in the collection bag by a protrusion which moves upward and downward in the solution tank while rotating around a rotation axis. Accordingly, without having to let the collection bag sink within the inactivation aqueous solution, for example by letting the protrusion move to the upper portion of the solution tank so as to come into contact with the collection bag, a hole can be reliably punched in the collection bag. After punching a hole in the collection bag, the collection bag is sunk within the inactivation aqueous solution, whereby the collection bag can be reliably sunk within the acidic solution in a short amount of time, the processing time can be reduced, and the processing efficiency can be improved.

The system may be (18) the system according to any one of the above-mentioned (14) to (16), wherein the hole punching portion in the rupturing device includes: a delivery portion which delivers the collection bag into the inactivation aqueous solution from an upper portion of the solution tank; and a protrusion which is arranged at a lower portion of the solution tank, rotates around a rotation axis and punches the hole in the collection bag.

According to the present system, the collection bag is delivered into the inactivation aqueous solution, and a hole is punched in the collection bag by the protrusion in the lower portion of the solution tank. After letting the collection bag sink within the inactivation aqueous solution, a hole is punched in the collection bag, whereby dirt and odor can be reliably prevented from spreading to the outside from the used absorbent articles inside the collection bag. Accordingly, the used absorbent articles can be crushed hygienically and safely.

The system may be (19) the system according to the above-mentioned (13), wherein the crushing device crushes, while the collection bag being supplied into the inactivation aqueous solution inside the crushing device, the used absorbent article inside the collection bag together with the collection bag within the inactivation aqueous solution.

According to the present system, the inactivation aqueous solution is stored inside the crushing device in advance, and the used absorbent articles inside the collection bag are crushed together with the collection bag within the inactivation aqueous solution. Accordingly, the used absorbent articles inside the collection bag can be crushed together with the collection bag, reliably within the inactivation aqueous solution.

The system may be (20) the system according to the above-mentioned (13) or (19), wherein the separation device is arranged directly under the crushing device, and directly receives the crushed matter and the inactivation aqueous solution from the crushing device.

According to the present system, the separation device is arranged directly under the crushing device, whereby the crushed matter which has been crushed by the crushing device and the inactivation aqueous solution can be quickly and reliably transferred to the separation device. Accordingly, even if dirt and fungi are mixed into the inactivation aqueous solution and odor is produced, the influence thereof can be suppressed to an even lower degree.

The system may be (21) the system according to any one of the above-mentioned (13) to (20), wherein the crushing device crushes the used absorbent article together with the collection bag so that an average value of a size of the crushed matter is 50 mm or larger and 100 mm or smaller.

According to the present system, the used absorbent articles are crushed so that an average value of a size of the crushed matter is 50 mm or larger and 100 mm or smaller by the adjustment of the crushing device. Note that the size of the crushed matter is as described above, such as the length of the longer side in a case in which the shape is rectangular, etc. In such a case, a slit can be reliably provided in the back sheet and/or the top sheet of each of the used absorbent articles, whereby substantially all pulp fibers can be extracted from the slit in each of the used absorbent articles. Accordingly, the recovery rate of the pulp fibers and the recovery rate of the superabsorbent polymers can be improved. It should be noted however that when the average value of the size is set to less than 50 mm, materials other than the pulp fibers and the superabsorbent polymers are cut into too small sizes, whereby it is difficult for such materials to be separated from the pulp fibers and the superabsorbent polymers. As a result, such materials which are mixed into the regenerated pulp fibers and the superabsorbent polymers increase, and the recovery rate of the pulp fibers and the superabsorbent polymers are to be reduced. On the other hand, when the average value of the size is set to be larger than 100 mm, it is difficult to apply a slit in the used absorbent articles. As a result, used absorbent articles from which pulp fibers and the superabsorbent polymers cannot be extracted occur, and the recovery rate of the pulp fibers and the superabsorbent polymers are to be reduced.

The system may be (22) the system according to any one of the above-mentioned (13) to (21), wherein the crushing device includes a biaxial crushing device.

According to the present system, as the crushing device for the used absorbent articles, a biaxial crushing device (for example: a biaxial rotation-type crushing machine, a biaxial differential-type crushing machine, a biaxial shear-type crushing machine) is used. Accordingly, the size of the crushed matter can be made roughly within the predetermined range. Therefore, a situation can be suppressed in which the crushed matter is too small and foreign matter is mixed into pulp fibers, or the crushed matter is too large and used absorbent articles from which pulp fibers cannot be extracted occur, whereby the recovery rate of pulp fibers are reduced.

The system may be (23) the system according to any one of the above-mentioned (13) to (22), wherein the inactivation aqueous solution is an acidic aqueous solution.

According to the present system, the inactivation aqueous solution is an acidic aqueous solution, whereby the superabsorbent polymers in the used absorbent articles can be reliably dehydrated and inactivated. Especially, when the crushing is performed within an acidic aqueous solution, alkaline volatile components which derive from excrement such as urine, etc., remain within the acidic aqueous solution without volatilizing, whereby production of odor by alkaline gas such as ammonia, etc., can be suppressed. Accordingly, in the crushing process, the crushing can be performed easily without the used absorbent articles being greatly inflated, whereby the processing efficiency can be improved.

The system may be (24) the system according to the above-mentioned (23), wherein the acidic aqueous solution includes a citric acid.

According to the present system, the acidic aqueous solution includes a citric acid (by for example: a concentration of 0.5 to 2.0 mass %), the superabsorbent polymers in the used absorbent articles can be dehydrated and inactivated, and further, there is hardly a negative influence to the workers by acid, and corrosion of equipment in each process by acid can be suppressed.

Advantageous Effects of Invention

According to the method and the system of the present invention, used absorbent articles can be crushed hygienically and safely, while suppressing the cost, when recovering pulp fibers from the used absorbent articles which are put into a collection bag.

DESCRIPTION OF EMBODIMENTS

Figure 1:
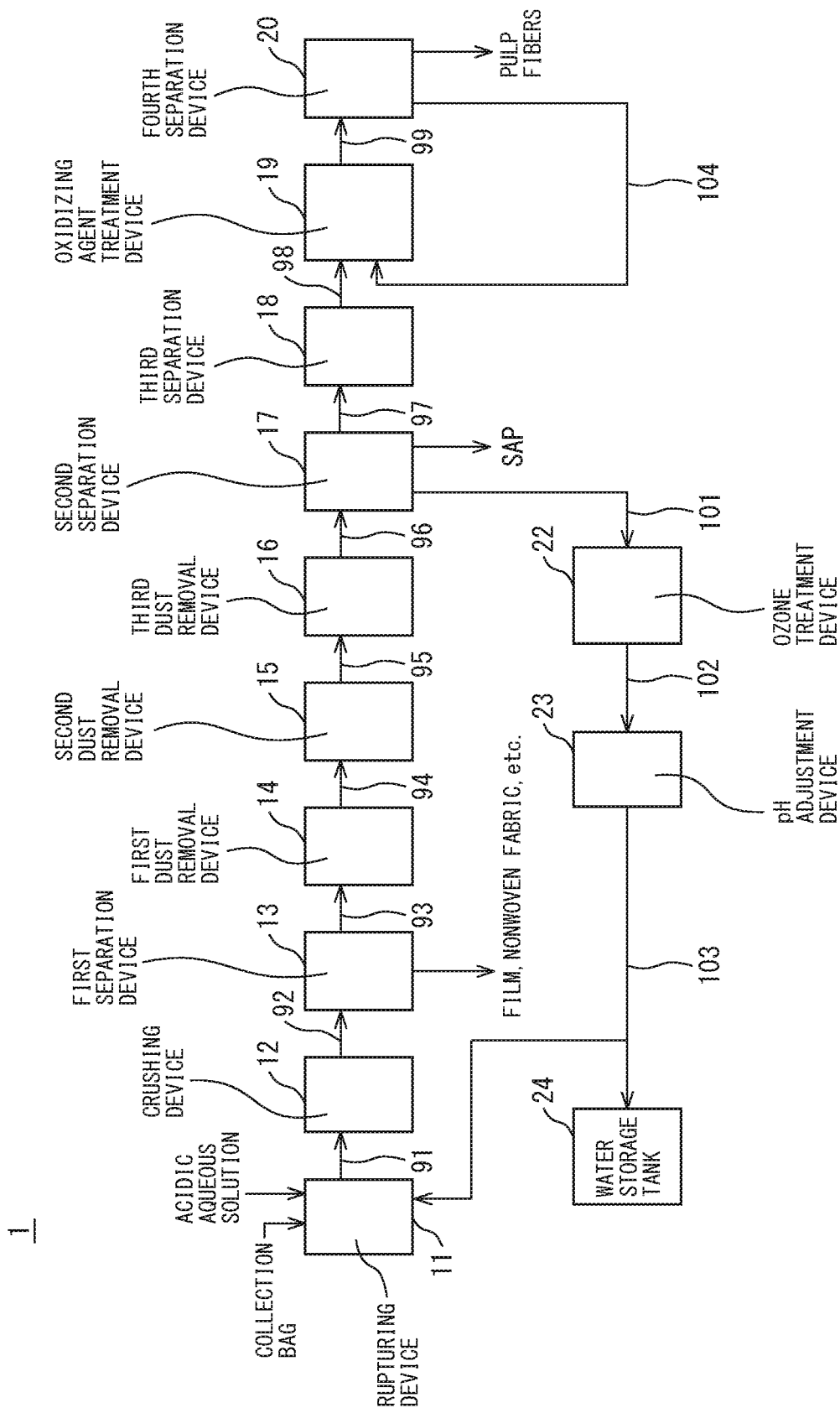
FIG. 1 is a block diagram which shows one example of the system according to an embodiment.

Hereinbelow, the method of recovering pulp fibers from a used absorbent article which includes pulp fibers and superabsorbent polymers, according to an embodiment is explained. It should be noted that a used absorbent article includes an absorbent article which has been used by a user and is in a state in which excrement of the user is absorbed and retained, and further includes an absorbent article which has been used and is in a state in which excrement is not absorbed or retained, and still further includes an absorbent article which has not been used and is discarded. As an absorbent article, for example, a diaper, a urine collection pad, a sanitary napkin, a bed sheet, a pet sheet, may be mentioned. Incidentally, the method of recovering pulp fibers from a used absorbent article according to the present embodiment produces recycled pulp fibers, thus may also be regarded as a method of producing recycled pulp fibers from a used absorbent article. Further, the method of recovering pulp fibers from a used absorbent article according to the present embodiment recovers superabsorbent polymers together with the pulp fibers during the process, and produces recycled superabsorbent polymers by separation, thus may also be regarded as a method of producing recycled superabsorbent polymers from a used absorbent article. Hereinbelow, a method of recovering pulp fibers from a used absorbent article is explained.

First Embodiment

The first embodiment is explained.

First, the configurational example of the absorbent article is explained. The absorbent article includes a top sheet, a back sheet, and an absorbent body which is arranged between the top sheet and the back sheet. As one example of the size of the absorbent article, a length of approximately 15 to 100 cm, and a width of 5 to 100 cm, may be mentioned. Incidentally, the absorbent article may include other members which are provided in general absorbent articles, for example, a diffusion sheet, a leakage prevention wall, etc.

As the configuration member of the top sheet, for example, a liquid permeable nonwoven fabric, synthetic resin film with liquid permeable holes, a composite sheet thereof, etc., may be mentioned. As the configuration member of the back sheet, for example, a liquid impermeable nonwoven fabric, a liquid impermeable synthetic resin film, a composite sheet thereof, etc., may be mentioned. As the configuration member of the diffusion sheet, for example, a liquid permeable nonwoven fabric, etc., may be mentioned. As the configuration member of the leakage prevention wall, for example, a liquid impermeable nonwoven fabric may be mentioned, and may include an elastic member such as rubber. The material of a nonwoven fabric or a synthetic resin film is not particularly limited as long as it can be used for an absorbent article, and for example, olefin-based resin such as polyethylene, polypropylene, etc., polyamide-based resin such as 6-nylon, 6,6-nylon, etc., polyester-based resin such as polyethylene terephthalate (PET), polybutylene terephthalate (PBT), etc., may be mentioned. In the present embodiment, an example of an absorbent article in which the configurational member of the back sheet is a film and the configurational member of the top sheet is a nonwoven fabric is explained.

As the configurational member of the absorbent body, absorbent materials, that is, pulp fibers and superabsorbent polymers may be mentioned. The pulp fibers are not particularly limited as long as they can be used for an absorbent article, and for example, cellulose-based fibers may be mentioned. As the cellulose-based fibers, for example, wood pulp, cross-linked pulp, non-wood pulp, regenerated cellulose, semi-synthetic cellulose, etc., may be mentioned. As the size of pulp fibers, the average value of a major axis of fibers of, for example, several tens of μm may be mentioned, and 20 to 40 μm is preferable, and the average value of fiber lengths of, for example, several mm may be mentioned, and 2 to 5 mm is preferable. The superabsorbent polymers (SAP) are not particularly limited as long as they can be used for an absorbent article, and for example, absorbent polymers of polyacrylate-based, polysulfonate-based, and maleic anhydride-based, may be mentioned. As the size of superabsorbent polymers (when dry), the average value of particle diameters of, for example, several hundreds of μm may be mentioned, and 200 to 500 μm is preferable.

One surface and the other surface of the absorbent body are joined to the top sheet and the back sheet, respectively, through an adhesive agent. In a plan view, the portion which extends toward the outer side of the absorbent body so as to surround the absorbent body among the top sheet (the peripheral portion) is joined to the portion which extends toward the outer side of the absorbent body so as to surround the absorbent body among the back sheet (the peripheral portion), through an adhesive agent. Accordingly, the absorbent body is wrapped inside the joined body of the top sheet and the back sheet. The adhesive agent is not particularly limited as long as it can be used for an absorbent article and is reduced with joining force by softening, etc., by later-described hot water, etc., and for example, a hot melt-type adhesive agent may be mentioned. As a hot melt-type adhesive agent, for example, a pressure-sensitive or heat-sensitive adhesive agent of a rubber-based such as styrene-ethylene-butadiene-styrene, styrene-butadiene-styrene, styrene-isoprene-styrene, etc., or of olefin-based such as polyethylene, etc., may be mentioned.

Next, the method of recovering pulp fibers from a used absorbent article which includes pulp fibers and superabsorbent polymers, according to the present embodiment is explained. In the present embodiment, used absorbent articles are recovered and obtained from outside for the purpose of reusing (recycling). At this time, the used absorbent articles are enclosed in a plurality of bags for collection (hereinbelow, which are referred to as "collection bags") so that dirt (such as excrement, etc.), fungi and odor do not leak outside. Each of the used absorbent articles inside the collection bag is recovered, etc., in a state of being mainly rolled or folded with the top sheet in which excrement is excreted placed on the inner side, so that excrement is not exposed to the top sheet side and odor is not spread to the surroundings.

First, the system 1 which is used for the method of recovering pulp fibers from a used absorbent article is explained. The system 1 is a system which recovers pulp fibers (and preferably further recovers superabsorbent polymers) from a used absorbent article, and thus is a system which produces recycled pulp fibers (and preferably further produces recycled superabsorbent polymers). FIG. 1 is a block diagram which shows one example of the system 1 according to the present embodiment. The system 1 includes the rupturing device 11, and the crushing device 12, and preferably further includes the first separation device 13, the first dust removal device 14, the second dust removal device 15, the third dust removal device 16, the second separation device 17, the third separation device 18, the oxidizing agent treatment device 19, and the fourth separation device 20. Hereinbelow, explanations are given in detail.

First, the rupturing device 11 and the crushing device 12 are explained. The rupturing device 11 punches a hole in a collection bag which includes used absorbent articles within the inactivation aqueous solution. The crushing device 12 crushes the used absorbent articles together with the collection bag within the inactivation aqueous solution which are sunk under the water surface of the inactivation aqueous solution. Note that the inactivation aqueous solution is an aqueous solution which inactivates superabsorbent polymers, and the absorption performance of the superabsorbent polymers is reduced by the inactivation. Accordingly, in a case in which the superabsorbent polymers have absorbed more water than the reduced absorption performance, the superabsorbent polymers release water to the amount acceptable for the absorption performance. That is, the superabsorbent polymers are dehydrated. Hereinbelow, an example of a case in which acidic aqueous solution is used as the inactivation aqueous solution is explained.

Figure 2:
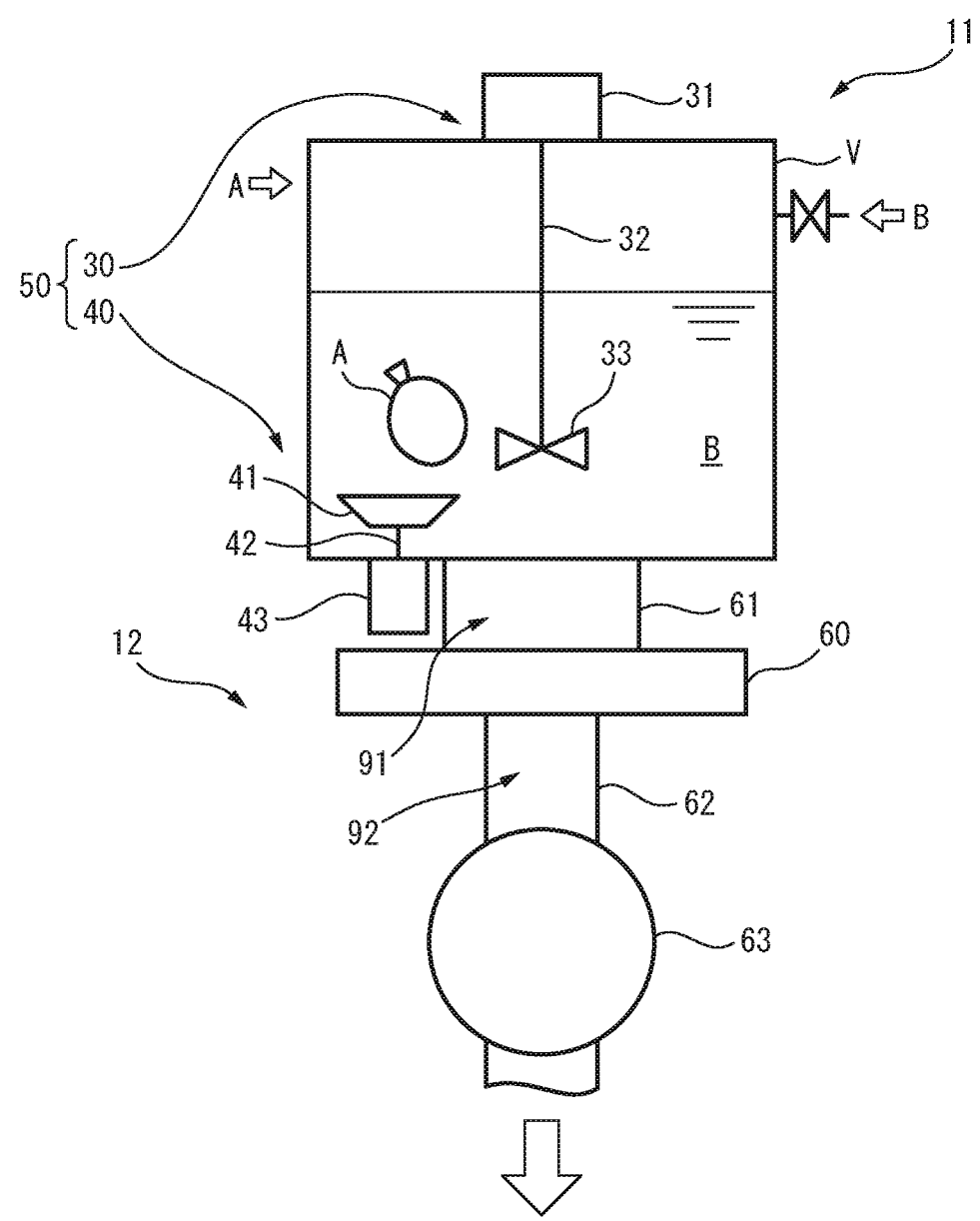
FIG. 2 is a schematic view which shows a configurational example of the rupturing device and the crushing device of FIG. 1.

FIG. 2 is a schematic view which shows the configurational example of the rupturing device 11 and the crushing device 12.

The rupturing device 11 stores the acidic aqueous solution B which is supplied for example through a pipe which includes a valve, and punches a hole in the collection bag A which is placed inside the acidic aqueous solution B. The rupturing device 11 includes the solution tank (the container) V and the hole punching portion 50. The solution tank V stores the acidic aqueous solution B. The hole punching portion 50 is provided inside the solution tank V, and when the collection bag A is placed inside the solution tank V, punches a hole in the surface of the collection bag A which comes into contact with the acidic aqueous solution B.

The hole punching portion 50 includes the delivery portion 30 and the rupturing portion 40. The delivery portion 30 delivers (withdraws) the collection bag A into the acidic aqueous solution B inside the solution tank V (physically and forcibly). As the delivery portion 30, for example, a stirring machine may be mentioned, and includes the stirring blade 33, the supporting axis (the rotation axis) 32 which supports the stirring blade 33, and the driving device 31 which rotates along the axis of the supporting axis 32. The stirring blade 33 rotates around the rotation axis (the supporting axis 32) by the driving device 31, whereby causes a swirling flow. The delivery portion 30 withdraws the collection bag A to the bottom portion direction of the acidic aqueous solution B (the solution tank V) by the swirling flow.

The rupturing portion 40 is arranged at the lower portion (preferably the bottom portion) of the solution tank V, and includes the rupturing blade 41, the supporting axis (the rotation axis) 42 which supports the rupturing blade 41, and the driving device 43 which rotates along the axis of the supporting axis 42. The rupturing blade 41 rotates around the rotation axis (the supporting axis 42) by the driving device 43, whereby punches a hole in the collection bag A which has moves to the lower portion of the acidic aqueous solution B (the solution tank V). Note that the lower portion of the solution tank V indicates the portion on the lower side than half the position in the height direction of the solution tank V.

Incidentally, the rupturing blade 41 of the hole punching portion 50 in the rupturing device 11 may be movable upward and downward in the solution tank V while rotating around the rotation axis (the supporting axis 42). In such a case, the rupturing blade 41 moves upward, whereby a hole can be punched in the collection bag A without having to let the collection bag A move to the lower portion of the acidic aqueous solution B (the solution tank V).

The crushing device 12 crushes the used absorbent articles inside the collection bag A together with the collection bag A which has sunk under the water surface of the acidic aqueous solution B. The crushing device 12 includes the crushing portion 60 and the pump 63. The crushing portion 60 is connected to the solution tank V through the pipe 61, and by opening the valve (which is not shown) of the pipe 61, the used absorbent articles inside the collection bag A which have been delivered together with the acidic aqueous solution B (the mixed solution 91) from the solution tank V mainly by gravity are crushed within the acidic aqueous solution B together with the collection bag A. As the crushing portion 60, a biaxial crushing device (for example: a biaxial rotation-type crushing machine, a biaxial differential-type crushing machine, a biaxial shear-type crushing machine) may be mentioned, and for example, a SUMICUTTER (manufactured by Sumitomo Heavy Industries Environment Co., Ltd.) may be mentioned. The pump 63 is connected to the crushing portion 60 through a pipe 62, and withdraws the crushed matter which is obtained by the crushing portion 60 together with the acidic aqueous solution B (the mixed solution 92) from the crushing portion 60, and delivers the same to the subsequent process. Note that the crushed matter includes the pulp fibers, the superabsorbent polymers, and other materials (the materials of the collection bag A, films, nonwoven fabric, elastic bodies, etc.). The rupturing device 11 and the crushing device 12 are preferably different devices.

Figure 3:
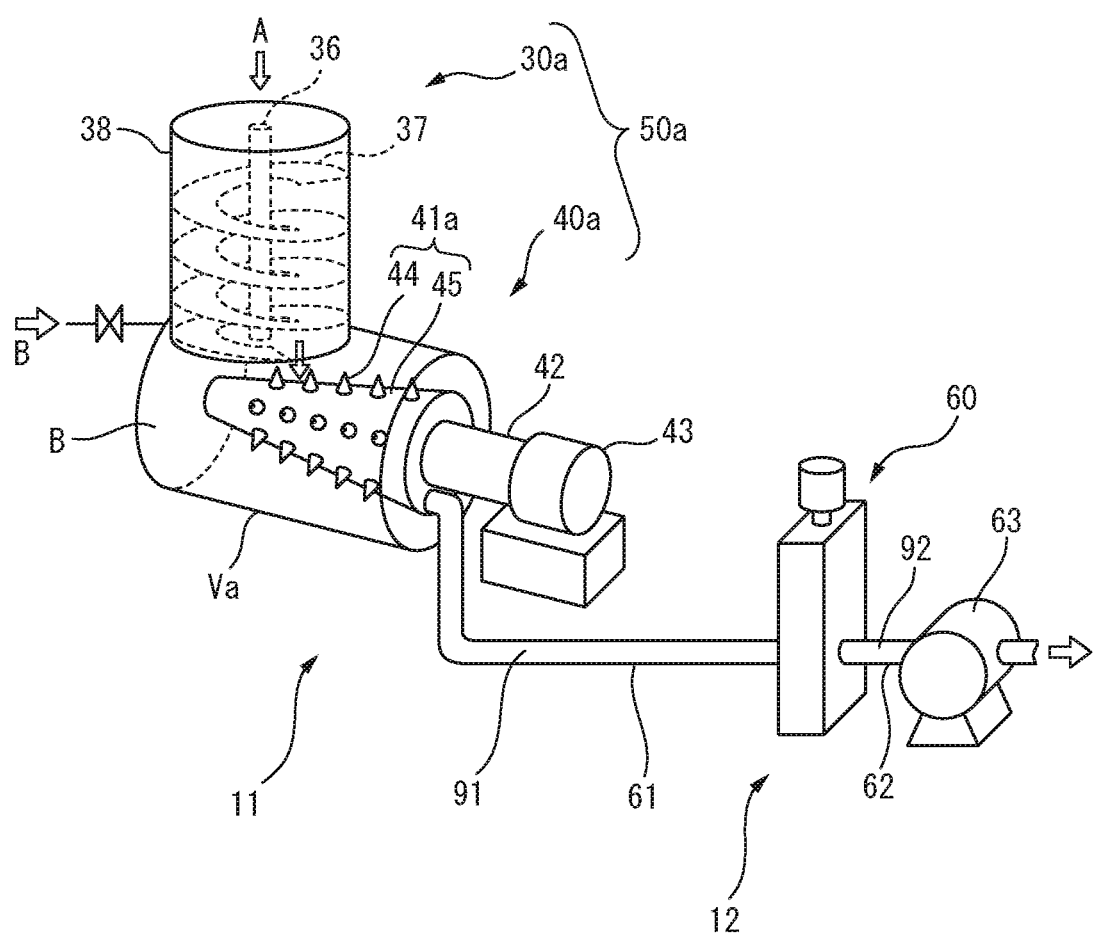
FIG. 3 is a schematic view which shows another configurational example of the rupturing device and the crushing device of FIG. 1.

FIG. 3 is a schematic view which shows another configurational example of the rupturing device 11 and the crushing device 12 of FIG. 1. The example of FIG. 3 is different from the example of FIG. 2 in the configuration of the rupturing device 11. The rupturing device 11 includes the solution tank Va and the hole punching portion 50a. The hole punching portion 50a includes the delivery portion 30a and the rupturing portion 40a. The delivery portion 30a delivers (pushes) the collection bag A into the acidic aqueous solution B inside the solution tank Va (physically and forcibly). The delivery portion 30a is directly connected to the upper portion of the solution tank Va, and includes the cylindrical member 38, the shaft member 36 which is arranged inside the cylindrical member 38 so as to overlap with the cylindrical axis thereof, and the plate member 37 which draws a spiral along the axis direction around the shaft member 36. From the upper portion of the delivery portion 30a, the collection bags A are one after another pushed into along the spiral of the plate member 37, whereby from the lower portion of the delivery portion 35, the collection bags A are delivered into the solution tank Va in which the acidic aqueous solution B is filled.

The rupturing portion 40*a* is arranged so as to extend to the inner side from the bottom portion of the solution tank Va, and includes a rotation rotor 41*a*, the supporting axis (the rotation axis) 42, and the driving device 43 which rotates along the axis of the supporting axis 42. The rotation rotor 41*a* includes the conical main body portion 45, and the plurality of protrusion portions 44 which are arranged on the side surface of the main body portion 45. The rotation rotor 41*a* rotates around the rotation axis (the supporting axis 42) within the acidic aqueous solution B (the solution tank Va), whereby holes are punched by the plurality of protrusion portions 44 in the collection bags A which have been transferred into the acidic aqueous solution B (the solution tank Va). As the one in which the rupturing portion 40*a* and the solution tank Va are integrated, for example, a Mixer Pulper (manufactured by Aikawa Iron Works Co., Ltd.), may be mentioned.

Figure 4:
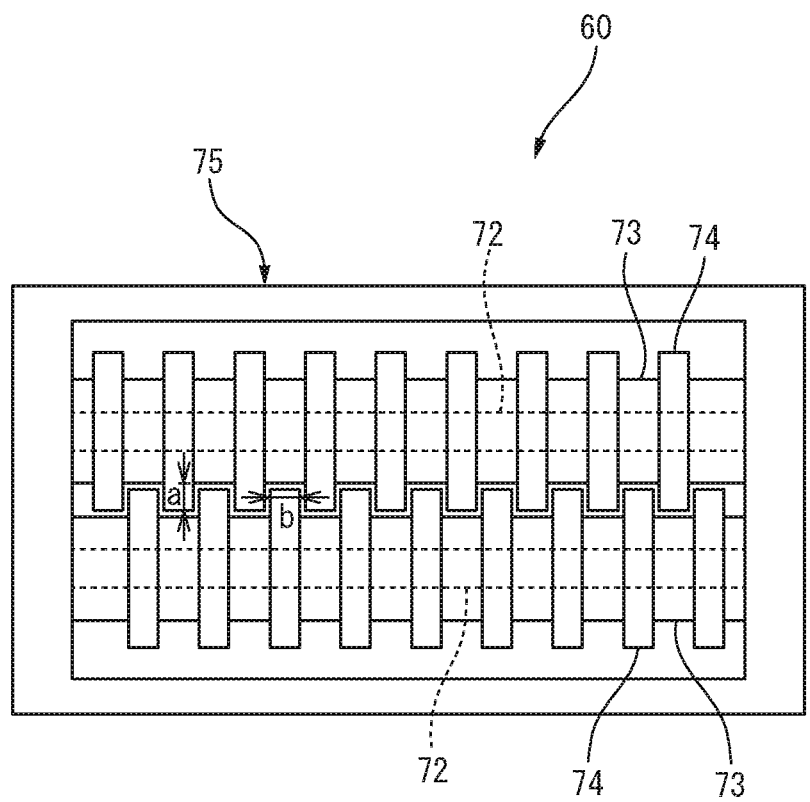
FIG. 4 is a partial enlarged view of the configurational example of the crushing device of FIG. 1.
Figure 5:
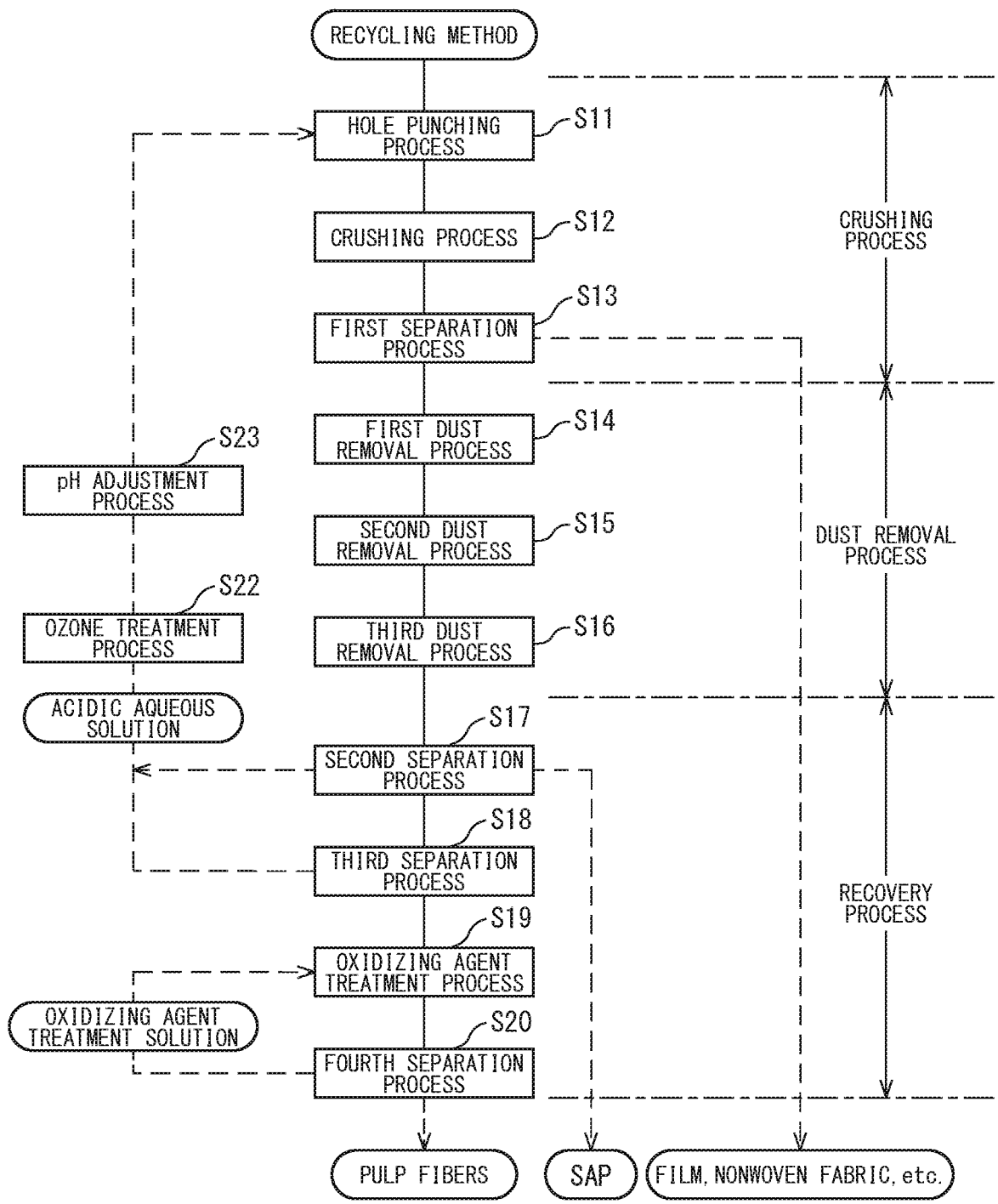
FIG. 5 is a flowchart which shows one example of the method according to an embodiment.

FIG. 4 is a partial enlarged view of the configurational example of the crushing device 60 of the crushing device 12 of FIG. 1. The biaxial crushing device of the crushing portion 60 includes the pair of rotation axes 72, 72, the both end portions of which are supported in a rotatable manner by the housing 75 and are arranged in parallel to each other. Each of the rotation axes 72 are rotated toward the inner side of the housing 75 by the driving device 71 which is not shown. To each of the rotation axes 72, the rotation blade 74 and the spacer 73 are alternately attached in the axis direction. In order that the rotation blade 74 and the spacer 73 which are attached to the pair of rotation axes 72 are engaged with each other in a state of facing each other, the sizes and the arrangement of the rotation blade 74 and the spacer 73 in each of the rotation axis 72, and the distance between both rotation axis 72 are set. At this time, the size of the crushed matter may be adjusted mainly by the difference a of the radiuses of the rotation blade 74 and the spacer 73, and by the thickness b in the axis direction of the rotation blade 74. For example, in a case in which the average value of the size of the crushed matter (in a plan view) is approximately 60 mm square, such size can be realized by adjusting the difference a and the thickness b so as to satisfy a≈b≈60 mm. Note that the size of the crushed matter is the length of the longer side in a case in which the shape of the crushed matter is substantially rectangular in a plan view, is a length of one side of a square when approximated by the square of the same area of the crushed matter in a case in which the shape is an irregular shape, and is the diameter in a case in which the shape is a circle. The average value of the size of the crushed matter is calculated by arbitrarily selecting 10 pieces of crushed matter immediately after the crushing which has an area larger than a×b before the crushing (for example: the top sheet or the back sheet, etc.), and by obtaining the average value thereof.

By referring to FIG. 1, the first separation device 13 stirs the mixed solution 92 which includes the crushed matter obtained by the crushing device 12 and the acidic aqueous solution, and while performing the washing so as to remove the dirt (the excrement, etc.) from the crushed matter, the pulp fibers, the superabsorbent polymers and the acidic aqueous solution are separated from the mixed solution 92 (the mixed solution 93), and delivers the same to the first dust removal device 14.

As the first separation device 13, for example, a washing machine including a washing and dehydrating tank and a water tank surrounding the washing and dehydrating tank, may be mentioned. However, the washing and dehydrating tank (a rotating drum) is used as a washing and sieving tank (separating tank). The size of the plurality of penetrating holes provided in the peripheral surface of the washing tank is set to be a size so that it is easy for the pulp fibers and the superabsorbent polymers among the crushed matter to pass therethrough and it is difficult for the other materials to pass therethrough. As the washing machine, for example, a horizontal-type washing machine ECO-22B (manufactured by Inamoto Co., Ltd.) may be mentioned.

Incidentally, in a case in which the acidic aqueous solution as the inactivation aqueous solution is not used in the rupturing device 11 to the first separation device 13, the acidic aqueous solution may be added from the first dust removal device 14, and the inactivation aqueous solution which includes the pulp fibers and the superabsorbent polymers to be supplied to the first dust removal device 14 may be made to be substantially the acidic aqueous solution. In such a case, the specific gravity and the size of the superabsorbent polymers can be easily adjusted by pH.

The first dust removal device 14, while maintaining the pH within the predetermined range, separates the acidic aqueous solution (the mixed solution 93) which includes the pulp fibers and the superabsorbent polymers delivered from the first separation device 13 into the pulp fibers and the superabsorbent polymers within the acidic aqueous solution (the mixed solution 94) and the other materials (the foreign matter) by a screen which has a plurality of openings. In order to maintain the pH within the predetermined range, for example, liquid which changes the pH (for example: water) is not added during the procedure, or in a case in which liquid is added, liquid with approximately the same pH (for example: acidic aqueous solution) is added. The predetermined range is the range in which the variation of pH is within ±1.0.

As the first dust removal device 14, for example, a screen separating machine (a coarse screen separator) may be mentioned. Note that the openings of the screen (the sieve) are not particularly limited, and for example, slits, round holes, rectangular holes, a mesh, may be mentioned, and in this embodiment, round holes are used. The size of the openings, that is, the size of the round holes (the diameter) is set so that it is possible for the pulp fibers and the superabsorbent polymers to pass through and it is difficult for the other materials which could not be removed by the first separation device 13 (foreign matter) to pass through, and further, so as to be larger than the size of the openings of the screen of the second dust removal device 15. The size of the round holes is, for example, 2 to 5 mm$\phi$ in diameter, and by such a size, the other materials (the foreign matter) of approximately 10 mm square or larger can at least be removed. In a case of slits, the size of the slits (the width) is, for example, 2 to 5 mm.

Incidentally, from the viewpoint of improving the efficiency of foreign matter removal, while applying pressure to the mixed solution 93 which is delivered from the first separation device 13 (for example: 0.5 to 1 kgf/cm$^2$), such a mixed solution 93 may be supplied to the first dust removal device 14. As the first dust removal device 14, a Pack Pulper (manufactured by Satomi Corporation), may be mentioned.

The second dust removal device 15, while maintaining the pH within the predetermined range, separates the acidic aqueous solution (the mixed solution 94) which includes the pulp fibers and the superabsorbent polymers delivered from the first dust removal device 14 into the pulp fibers and the superabsorbent polymers within the acidic aqueous solution (the mixed solution 95) and the other materials (the foreign matter) by a screen which has a plurality of openings.

As the second dust removal device 15, for example, a screen separating machine may be mentioned. Note that the openings of the screen (the sieve) are not particularly limited, and for example, slits, round holes, rectangular holes, a mesh, may be mentioned, and in this embodiment, slits are used. The size of the slits (the width) is set so that it is possible for the pulp fibers and the superabsorbent polymers to pass through and it is difficult for the other materials which could not be removed by the first dust removal device 14 (foreign matter) to pass through. The size of the slits is, for example, 0.2 to 0.5 mm in width, and by such a size, the other materials (the foreign matter) of approximately 3 mm square or larger can at least be removed. In a case of round holes, the size of the round holes (the diameter) is, for example, 0.2 to 0.5 mm$\phi$.

Incidentally, from the viewpoint of improving the efficiency of foreign matter removal, while applying pressure to the mixed solution 94 which is delivered from the first dust removal device 14 (for example: 0.5 to 2 kgf/cm$^2$), such a mixed solution 94 may be supplied to the second dust removal device 15. The pressure is, from the viewpoint of removing relatively smaller foreign matter, preferably higher than the pressure of the first dust removal device 14. As the second dust removal device 15, for example, Ramo-screen (manufactured by Aikawa Iron Works Co., Ltd.), may be mentioned.

The third dust removal device 16, while maintaining the pH within the predetermined range, performs centrifugal separation for the acidic aqueous solution (the mixed solution 95) which includes the pulp fibers and the superabsorbent polymers delivered from the second dust removal device 15, and separates the pulp fibers and the superabsorbent polymers within the acidic aqueous solution (the mixed solution 96) and the other materials (the foreign matter with a larger weight).

As the third dust removal device 16, for example, a cyclone separating machine may be mentioned. In order that the pulp fibers and the superabsorbent polymers within the acidic aqueous solution which have relatively smaller specific gravity is raised, and foreign matter which has larger specific gravity (such as metal, etc.) is let to descend, the acidic aqueous solution (the mixed solution 95) which includes the pulp fibers and the superabsorbent polymers is supplied into a conical housing placed in an up-side down manner of the third dust removal device 16 (which is not shown) in a predetermined flow rate. As the third dust removal device 16, for example, an ACT low concentration cleaner (manufactured by Aikawa Iron Works Co., Ltd.), may be mentioned.

The second separation device 17 separates the acidic aqueous solution (the mixed solution 96) which includes the pulp fibers and the superabsorbent polymers delivered from the third dust removal device 16 into the pulp fibers within the acidic aqueous solution (the mixed solution 97) and the superabsorbent polymers within the acidic aqueous solution by a screen which has a plurality of openings. Accordingly, the second separation device 17 may also be regarded as a dehydrating machine which removes the acidic aqueous solution together with the superabsorbent polymers from the mixed solution 96.

As the second separation device 17, for example, a drum screen separating machine may be mentioned. Note that the openings of the drum screen (the sieve) are not particularly limited, and for example, slits, round holes, rectangular holes, a mesh, may be mentioned, and in this embodiment, slits are used. The size of the slits (the width) is set so that it is possible for the superabsorbent polymers to pass through and it is difficult for the pulp fibers to pass through. In a case of slits, the size of the slits is, for example, 0.2 to 0.8 mm in width, and by such a size, a large number of superabsorbent polymers can at least be removed. In a case of round holes, the size of the round holes is, for example, 0.2 to 0.8 mm$\phi$ in diameter. As the second separation device 17, for example, a drum screen dehydrator (manufactured by Toyo Screen Co., Ltd.), may be mentioned.

The third separation device 18, while separating the pulp fibers delivered from the second separation device 17, the superabsorbent polymers which have remained without being separated and the acidic aqueous solution (the mixed solution 97) into solid (the mixed matter 98) which includes the pulp fibers and the superabsorbent polymers and liquid which includes the superabsorbent polymers and the acidic aqueous solution by a screen which has a plurality of openings, applies pressure to the solid so as to crush the superabsorbent polymers in the solid. Accordingly, the third separation device 18 may also be regarded as a dehydrating machine of a pressure dehydration type which removes the acidic aqueous solution together with the superabsorbent polymers from the mixed solution 97. Note that the solid (the mixed matter 98) includes a slight amount of the acidic aqueous solution.

As the third separation device 18, for example, a screw press dehydrating machine may be mentioned. Such a screw press dehydrating machine includes a cylindrical drum screen, a screw axis which extends along the cylindrical axis of the drum screen, and a screw blade which is provided on the outer side of the screw axis and rotates along the inner peripheral surface of the drum screen. Note that the openings of the drum screen (the sieve) are not particularly limited, and for example, slits, round holes, rectangular holes, a mesh, may be mentioned, and in this embodiment, slits are used. The size of the slits (the width) is set so that it is possible for the superabsorbent polymers to pass through and it is difficult for the pulp fibers to pass through. In a case of slits, the size of the slits is, for example, 0.1 to 0.5 mm in width, and by such a size, the remaining superabsorbent polymers can at least be removed. The third separation device 18, while delivering the liquid which includes the superabsorbent polymers and the acidic aqueous solution from the slits on the side surface of the drum screen, crushes and delivers the solid which includes the pulp fibers and the superabsorbent polymers from the gap of the lid body at the tip of the drum screen in which the pressure is adjusted. As the pressure which is applied to the lid body, for example, 0.01 MPa or more and 1 MPa or less, may be mentioned. As the third separation device 18, a screw press dehydrator (manufactured by Kawaguchi Seiki Co., Ltd.), may be mentioned.

The oxidizing agent treatment device 19 treats the pulp fibers which include the crushed superabsorbent polymers in the solid delivered from the third separation device 18 (the mixed matter 98) with an aqueous solution (the treatment solution) which includes an oxidizing agent. Accordingly, the oxidizing agent treatment device 19 performs oxidative decomposition for the superabsorbent polymers so as to be removed from the pulp fibers, and delivers the pulp fibers which do not include the superabsorbent polymers together with the treatment solution (the mixed solution 99).

The oxidizing agent treatment device, in a case in which ozone is used as the oxidizing agent, for example, includes a treatment tank and an ozone supplying device. The treatment tank stores the acidic aqueous solution as the treatment solution. The ozone supplying device supplies ozone containing gas which is a gaseous substance to the treatment tank. As the ozone generating device of the ozone supplying device, for example, ozone water exposure tester ED-OWX-2 manufactured by EcoDesign, Inc., and ozone generator OS-25V manufactured by Mitsubishi Electric Corporation, may be mentioned. The nozzle of the ozone supplying device is arranged at the lower portion of the treatment tank and has, for example, a tube-like or a plate-like shape. The nozzle supplies the ozone containing gas Z into the treatment solution as a plurality of fine bubbles. As the treatment solution, from the viewpoint of suppressing the deactivation of ozone and of the inactivation of the superabsorbent polymers, an acidic aqueous solution is preferable, and from the viewpoint of reducing influence to the workers and to the device by acid, an organic acid is preferable, and among the organic acid, citric acid is preferable from the viewpoint of removing metal.

Incidentally, ozone gas is used as the oxidizing agent, however, the present embodiment is not limited to this example, and other oxidizing agents may be used, and other than gaseous oxidizing agent, a liquid oxidizing agent or the one in which a solid oxidizing agent is melt in a solution may also be used. As the oxidizing agent, for example, chlorine dioxide, peracetic acid, sodium hypochlorite, hydrogen peroxide, may be mentioned.

The fourth separation device 20 separates the pulp fibers from the treatment solution which includes the pulp fibers treated by the oxidizing agent treatment device 19 (the mixed solution 99) by a screen which has a plurality of openings, whereby the pulp fibers are recovered and the recycled pulp fibers are produced.

As the fourth separation device 20, for example, a screen separating machine may be mentioned. Note that the openings of the screen (the sieve) are not particularly limited, and for example, slits, round holes, rectangular holes, a mesh, may be mentioned, and in this embodiment, slits are used. The size of the slits (the width) is set so that it is difficult for the pulp fibers to pass through. In a case of slits, the size of the slits is, for example, 0.2 to 0.8 mm in width. In a case of round holes, the size of the round holes is, for example, 0.2 to 0.8 mm$\phi$ in diameter.

Incidentally, the system 1 includes, preferably, the ozone treatment device 22, the pH adjustment device 23, and the water storage tank 24. These devices are for regenerating and reusing the acidic aqueous solution which is used in the system 1. By reusing the acidic aqueous solution, the cost of the acidic aqueous solution can be reduced. The ozone treatment device 22 performs the sterilization treatment for the acidic aqueous solution 101 in which the superabsorbent polymers are further separated from the superabsorbent polymers and the acidic aqueous solution which are separated by the second separation device 17, by an ozone containing aqueous solution. The pH adjustment device 23 adjusts pH of the acidic aqueous solution 102 which has been performed with the sterilization treatment by the ozone containing aqueous solution, so as to produce the regenerated acidic aqueous solution 103. The water storage tank 24 stores the surplus among the regenerated acidic aqueous solution 103.

Figure 6:
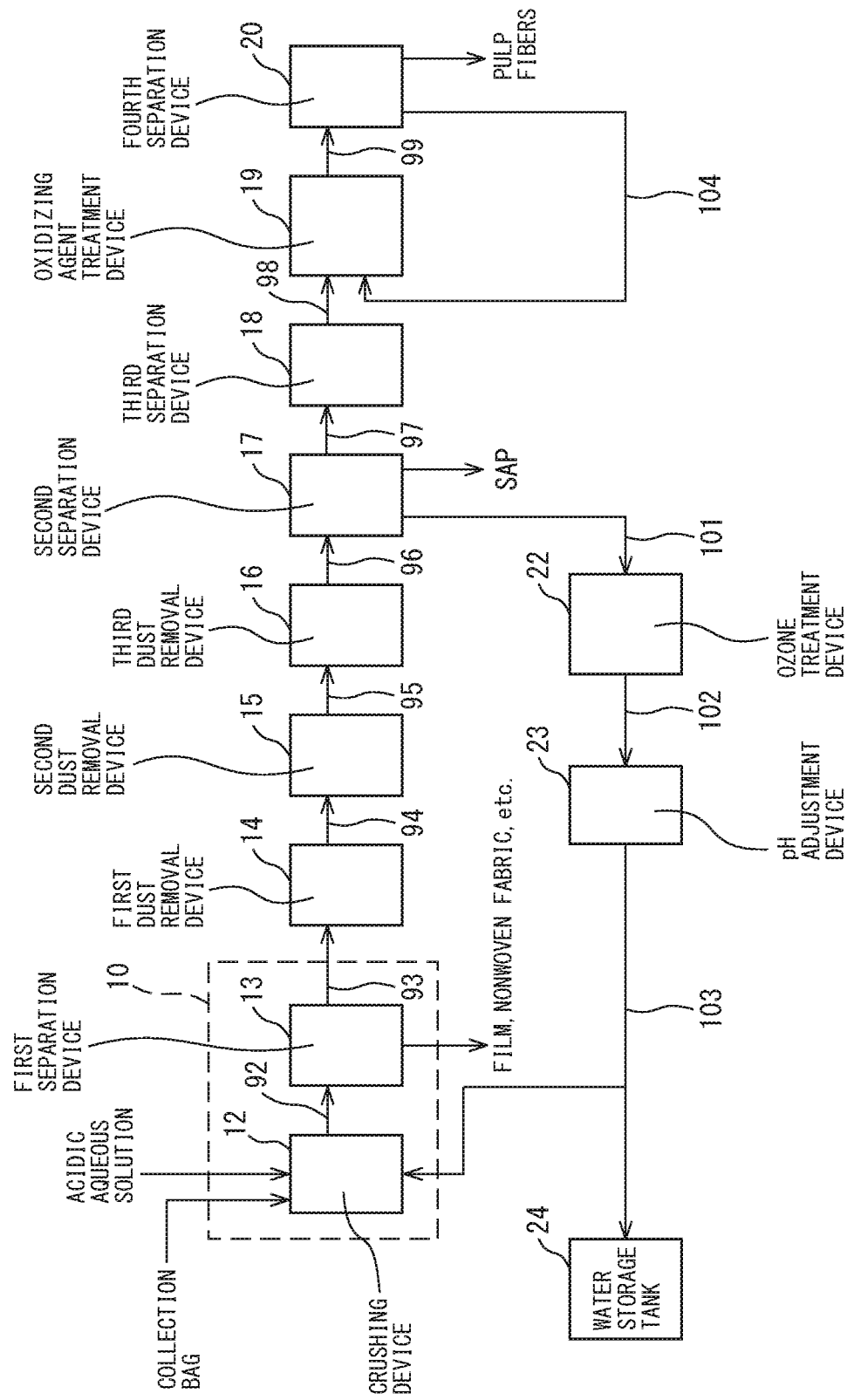
FIG. 6 is a block diagram which shows another example of the system according to an embodiment.

Next, the method of recovering the pulp fibers from a used absorbent article is explained. This method is a method which recovers pulp fibers (and preferably further recovers superabsorbent polymers) from a used absorbent article, and thus is a method which produces recycled pulp fibers (and preferably further produces recycled superabsorbent polymers). FIG. 6 is a flow chart which shows one example of the method according to the present embodiment. This method includes the hole punching process S11 and the crushing process S12, and preferably includes the first separation process S13, the first dust removal process S14, the second dust removal process S15, the third dust removal process S16, the second separation process S17, the third separation process S18, the oxidizing agent treatment process S19, and the fourth separation process S20. Hereinbelow, explanations are given in detail.

The hole punching process S11 is performed by the rupturing device 11. The collection bag A enclosing the used absorbent articles are thrown into the solution tank V in which the acidic aqueous solution B are stored, and a hole is punched in the surface of the collection bag A which comes into contact with the acidic aqueous solution B. When the hole is punched in the collection bag A, the acidic aqueous solution B surrounds and seals the collection bag A so that the dirt, fungi and odor of the used absorbent articles inside the collection bag A are not released outside. When the acidic aqueous solution enters inside the collection bag A from the hole, the gas inside the collection bag A exits to the outside of the collection bag A, the specific gravity of the collection bag A is to be larger than that of the acidic aqueous solution B, and the collection bag A sinks inside the acidic aqueous solution B. Further, the acidic aqueous solution B inactivates the superabsorbent polymers inside the used absorbent articles inside the collection bag A.

The superabsorbent polymers inside the used absorbent articles are inactivated and the absorption performance thereof is reduced, whereby the superabsorbent polymers are dehydrated and the particle diameter is decreased, so that the handling at each of the subsequent processes becomes easier and the processing efficiency is improved. The reason why the acidic aqueous solution, that is, an aqueous solution of inorganic acid or organic acid is used as the inactivation aqueous solution is that, in comparison with an aqueous solution of lime or calcium chloride, ash content is less likely to remain in the pulp fibers, and further, it is easier to adjust the degree of inactivation (the particle diameter and the degree of specific gravity) by pH. As the pH of the acidic aqueous solution, 1.0 or higher and 4.0 or lower is preferable, and 1.2 or higher and 2.5 or lower is more preferable. When the pH is too high, the absorption performance of the superabsorbent polymers cannot be sufficiently lowered. Further, the sterilization performance may be lowered. When the pH is too low, there is a risk of corrosion in the equipment, and a large amount of alkaline chemicals are to be required for neutralization treatment during wastewater treatment. Especially, in order to separate the pulp fibers and the superabsorbent polymers from the other materials, it is preferable that the size and the specific gravity of the pulp fibers and those of the superabsorbent polymers are relatively similar to each other. Accordingly, by setting the pH of the acidic aqueous solution to 1.0 or higher and 4.0 or lower, the superabsorbent polymers can be made to be even smaller by the inactivation, whereby the size and the specific gravity of the pulp fibers and those of the superabsorbent polymers can be made to be relatively similar to each other. As the organic acid, for example, citric acid, tartaric acid, glycolic acid, malic acid, succinic acid, acetic acid, ascorbic acid, etc., may be mentioned, and hydroxycarbonate-based organic acid such as citric acid, tartaric acid, gluconic acid, etc., is especially preferable. By the chelating effect of citric acid, metal ions, etc., in the excrement can be trapped and removed, and further, by the washing effect of citric acid, high level of dirt component removal effect can be expected. On the other hand, as the inorganic acid, for example, sulfuric acid, hydrochloric acid, and nitric acid, may be mentioned, and from the viewpoint of not including chlorine, and the cost, etc., sulfuric acid is preferable. Since pH varies depending on the water temperature, the pH in the present invention is referred to as the pH when measured at an aqueous solution temperature at 20° C. The organic acid concentration of the organic acid aqueous solution is not particularly limited, and in a case in which the organic acid is citric acid, 0.5 mass % or higher and 4 mass % or lower is preferable. The inorganic acid concentration of the inorganic acid aqueous solution is not particularly limited, and in a case in which the inorganic acid is sulfuric acid, 0.1 mass % or higher and 0.5 mass % or lower is preferable.

In the rupturing device 11 shown in FIG. 2, for example, first, by the rotation of the stirring blade 33 around the rotation axis (the supporting axis 32), a swirling flow is caused in the acidic aqueous solution B. and the collection bag A is withdrawn to the bottom portion of the acidic aqueous solution B (the solution tank V) physically and forcibly. Then, the collection bag A which has been moved to the bottom portion comes into contact with the rupturing blade 41 by the rotation of the rupturing blade 41 around the rotation axis (the supporting axis 42), whereby a hole is punched. Incidentally, in a case in which the rupturing blade 41 is movable upward and downward in the solution tank V, the rupturing blade 41 may move upward, whereby a hole can be punched in the collection bag A without having to let the collection bag A be withdrawn to the bottom portion of the acidic aqueous solution B (the solution tank V) by the swirling flow.

Further, in the rupturing device 11 shown in FIG. 3, for example, first, the collection bags A are one after another pushed into along the spiral of the plate member 37 from the upper portion of the delivery portion 30a and are let to move along the spiral on the plate member 37, whereby are delivered into the solution tank Va which is filled with the acidic aqueous solution B physically and forcibly from the lower portion of the delivery portion 30a. Further, the collection bags A which have been moved to the solution tank Va come into contact with the protrusion portion 44 by the rotation of the rotation rotor 41a around the rotation axis (the supporting axis 42), whereby a hole is punched.

The crushing process S12 is performed by the crushing device 12. While the acidic aqueous solution B which includes the collection bag A in which a hole is punched and is sunk under the water surface of the acidic aqueous solution B, that is the mixed solution 91, is being discharged from the solution tank V, the used absorbent articles inside the collection bag A are crushed together with the collection bag A within the acidic aqueous solution B.

For example, in the crushing device 12 shown in FIG. 2, first, by opening the valve (which is not shown) of the pipe 61, the used absorbent articles inside the collection bag A which have been delivered together with the acidic aqueous solution B from the solution tank V mainly by gravity are crushed within the acidic aqueous solution B together with the collection bag A by the crushing portion 60 (the in-solution crushing process). At this time, in the crushing portion 60 shown in FIG. 4, the mixed solution 91 is supplied between the rotation blade 74 which rotates around the one rotation axis 72 toward the inner side of the crushing portion 60 and the spacer 73, and the rotation blade 74 which rotates around the other rotation axis 72 toward the inner side of the crushing portion 60 and the spacer 73, whereby the collection bag A is crushed together with the bag. Further, in the crushing device 12 shown in FIG. 2, the acidic aqueous solution B (the mixed solution 92) which includes the crushed matter obtained by the crushing portion 60 (the in-solution crushing process) is withdrawn from the crushing portion 60 by the pump 63 (the withdrawal process), and is delivered to the subsequent process.

The crushing process S12, as described later, preferably includes a process of crushing the used absorbent articles together with the collection bag A so that the average value of the size of the crushed matter is 50 mm or larger and 100 mm or smaller. In other words, it is preferable that the biaxial crushing device of the crushing portion 60 is adjusted mainly by the difference a of the radiuses of the rotation blade 74 and the spacer 73, and by the thickness b in the axis direction of the rotation blade 74 so that the average value of the size of the crushed matter is to be 50 mm or larger and 100 mm or smaller.

As the absorbent article, a length of approximately 150 mm to 1000 mm and a width of 100 mm to 1000 mm is assumed. By crushing the crushed matter so that the average value of the size of the crushed matter is to be 50 mm or larger and 100 mm or smaller, a slit can be reliably provided in the back sheet and/or the top sheet of each of the used absorbent articles. Accordingly, substantially all pulp fibers can be extracted from the slit in each of the used absorbent articles, whereby the recovery rate of the pulp fibers (the total amount of pulp fibers to be regenerated/the total amount of pulp fibers in the supplied used absorbent articles) can be improved. When the average value of the size is set to less than 50 mm, materials other than the pulp fibers (for example: films (such as the material of the collection bag A, the back sheet, etc.), nonwoven fabric (such as the top sheet, etc.), elastic bodies (such as rubbers for leakage prevention walls)) are cut into too small sizes, whereby it is difficult for such materials to be separated from the pulp fibers in the subsequent processes. As a result, foreign matter (other materials) to be mixed into the regenerated pulp fibers is increased, and the recovery rate of the pulp fibers is to be reduced. On the other hand, when the average value of the size is set to be larger than 100 mm, it is difficult to apply a slit in the used absorbent articles. As a result, the size of the crushed matter is so large that it is bulky, and the amount (the processing amount) of the crushed matter (the disposable diapers) which can be processed by the first separation device 13 of the first separation process S13 is reduced, whereby the processing efficiency is reduced. Further, used absorbent articles from which pulp fibers cannot be extracted occur, and the recovery rate of the pulp fibers is to be reduced. The specific example is described later.

The first separation process S13 is performed by the first separation device 1. The mixed solution 92 which includes the crushed matter and the acidic aqueous solution obtained by the crushing device 12 is stirred, and while the washing to remove dirt from the crushed matter is performed, the mixed solution 92 is separated into the pulp fibers, the superabsorbent polymers and the acidic aqueous solution, and other materials. At this time, in order to improve the washing effect, and/or to adjust pH, an acidic aqueous solution may be separately added. As a result, the pulp fibers, the superabsorbent polymers and the acidic aqueous solution (partially including the other materials, etc.) among the mixed solution 92 is separated by passing through the penetration hole, so as to be delivered from the first separation device 13 (the mixed solution 93). On the other hand, the other materials except the pulp fibers, the superabsorbent polymers and the acidic aqueous solution among the mixed solution 92 cannot pass through the penetration hole, and remain inside the first separation device 13 or is delivered through another route. Note that a portion of the other materials cannot be completely separated and is delivered together with the mixed solution 93. When a washing machine is used as the first separation device 13, as the size of the penetration hole of the washing machine which functions as a sieve, 5 mm to 20 mm$\phi$ in a case of round holes may be mentioned, and in a case of holes with other shapes, a size with substantially the same area as the round hole may be mentioned.

The present method (the system) includes, as described above, in the crushing process which crushes the used absorbent articles (the hole punching process S11, the crushing process S12, and the first separation process S13), at least the hole punching process S11 and the crushing process S12.

Incidentally, in a case in which the acidic aqueous solution as the inactivation aqueous solution is not used in the hole punching process S11 to the first separation process S13, it is preferable that the acidic aqueous solution is added from the first dust removal process S14, and the inactivation aqueous solution which includes the pulp fibers and the superabsorbent polymers to be supplied to the first dust removal process S14 is made to be substantially the acidic aqueous solution. In such a case, the specific gravity and the size of the superabsorbent polymers can be easily adjusted by pH.

The first dust removal process S14 is performed by the first dust removal device 14. While the acidic aqueous solution which includes the pulp fibers and the superabsorbent polymers delivered from the first separation device 13, that is, the mixed solution 93 maintains pH within the predetermined range, the mixed solution 93 is separated into the acidic aqueous solution which includes the pulp fibers and the superabsorbent polymers and the other materials (the foreign matter) by a screen. As a result, the pulp fibers, the superabsorbent polymers and the acidic aqueous solution (partially including the other materials, etc.) among the mixed solution 93 is separated by passing through the screen, and is delivered from the first dust removal device 14 (the mixed solution 94). On the other hand, the other materials except the pulp fibers, the superabsorbent polymers and the acidic aqueous solution among the mixed solution 93 cannot pass through the screen, and remain inside the first dust removal device 14 or is delivered through another route. Note that a portion of the other materials cannot be completely separated and is delivered together with the mixed solution 94.

Incidentally, it is preferable that the acidic aqueous solution is adjusted with pH at least until the first dust removal process S14, so that the differences between the specific gravity and the size of the superabsorbent polymers and the specific gravity and the size of the pulp fibers are within a predetermined range. The predetermined range is, for example, a range in which one is within 0.2 to 5 times as much as the other. In such a case, the processes before the first dust removal process S14 can be regarded as an inactivation process of inactivating the superabsorbent polymers by mixing the pulp fibers and the superabsorbent polymers, and the acidic aqueous solution which is adjusted with pH so that the differences between the specific gravity and the size of the superabsorbent polymers and the specific gravity and the size of the pulp fibers are within a predetermined range.

Further, as the concentration of the total of the pulp fibers and the superabsorbent polymers within the acidic solution in the first dust removal process S14, for example, 0.1 mass % or more and 10 mass % or less may be mentioned, and 0.1 mass % or more and 5 mass % or less is preferable. Still further, as the ratio of the pulp fibers to the superabsorbent polymers within the acidic solution, for example, 50 to 90 mass %: 50 to 10 mass % may be mentioned.

The second dust removal process S15 is performed by the second dust removal device 15, and while the acidic aqueous solution which includes the pulp fibers and the superabsorbent polymers delivered from the first dust removal device 14, that is, the mixed solution 94 maintains pH within the predetermined range, the mixed solution 94 is separated into the acidic aqueous solution which includes the pulp fibers and the superabsorbent polymers and the other materials (the foreign matter) by a screen. As a result, the pulp fibers, the superabsorbent polymers and the acidic aqueous solution (partially including the other materials, etc.) among the mixed solution 94 is separated by passing through the screen, and is delivered from the second dust removal device 15 (the mixed solution 95). On the other hand, the other materials except the pulp fibers, the superabsorbent polymers and the acidic aqueous solution among the mixed solution 94 cannot pass through the screen, and remain inside the second dust removal device 15 or is delivered through another route. Note that a portion of the other materials cannot be completely separated and is delivered together with the mixed solution 95. Incidentally, the acidic aqueous solution is adjusted with pH so that the differences between the specific gravity and the size of the superabsorbent polymers and the specific gravity and the size of the pulp fibers are within a predetermined range.

The third dust removal process S16 is performed by the third dust removal device 16, and while the acidic aqueous solution which includes the pulp fibers and the superabsorbent polymers delivered from the second dust removal device 15, that is, the mixed solution 95 maintains pH within the predetermined range, the mixed solution 95 is subjected to a centrifugal separation by a conical housing placed in an up-side down manner and is separated into the pulp fibers and the superabsorbent polymers within the acidic aqueous solution and the other materials (the foreign matter with a larger weight). As a result, the pulp fibers, the superabsorbent polymers and the acidic aqueous solution among the mixed solution 95 are delivered from the upper portion of the third dust removal device 16 (a cyclone separating machine) (the mixed solution 96). On the other hand, the other materials except the pulp fibers, the superabsorbent polymers and the acidic aqueous solution among the mixed solution 95, such as metal, are delivered from the lower portion of third dust removal device 16 (a cyclone separating machine). Incidentally, the acidic aqueous solution is adjusted with pH so that the differences between the specific gravity and the size of the superabsorbent polymers and the specific gravity and the size of the pulp fibers are within a predetermined range.

The present method (the system) includes, as described above, in the dust removal process of removing foreign matter (other materials) (the first dust removal process S14 (the first dust removal device 14) to the third dust removal process S16 (the third dust removal device 16)), at least the second dust removal process S15 (the second dust removal device 15) and the third dust removal process S16 (the third dust removal device 16). Accordingly, the pulp fibers and the superabsorbent polymers can be easily separated by mainly the size of resin materials among other materials of the used absorbent articles except the pulp fibers and the superabsorbent polymers (the second dust removal process S15 (the second dust removal device 15)), and can be further separated easily from materials with large specific gravity among the other materials, for example from metallic materials by the specific gravity (the third dust removal process S16 (the third dust removal device 16)). Further, thereafter, the pulp fibers and the superabsorbent polymers are separated from each other (the second and the third separation processes S17, S18 (the second and the third separation devices 17, 18)), whereby the pulp fibers and the superabsorbent polymers can be recovered from used absorbent articles. At this time, the number of processes of separating the pulp fibers and the superabsorbent polymers from the other materials can be reduced. That is, the processing efficiency of separating the superabsorbent polymers and the pulp fibers can be improved.

The second separation process S17 is performed by the second separation device 17. The acidic aqueous solution which includes the pulp fibers and the superabsorbent polymers delivered from the third dust removal device 16, that is, the mixed solution 96, is separated into the pulp fibers within the acidic aqueous solution and the superabsorbent polymers within the acidic aqueous solution by a drum screen. As a result, the acidic aqueous solution which includes the superabsorbent polymers is separated from the mixed solution 96 by passing through the drum screen and is delivered from the second separation device 17. On the other hand, the acidic aqueous solution which includes the pulp fibers among the mixed solution 96 cannot pass through the drum screen, and is delivered from the second separation device 17 through another route (the mixed solution 97). Incidentally, thereafter, the superabsorbent polymers can be separated from the separated superabsorbent polymers and the acidic aqueous solution by a screen separating machine, etc. Accordingly, the aforementioned processes can be regarded as a process of separating and recovering the superabsorbent polymers, and thus a process of producing recycled superabsorbent polymers.

The third separation process S18 is performed by the third separation device 18. The pulp fibers, the remaining superabsorbent polymers which could not be separated and the acidic aqueous solution delivered from the second separation device 17, that is the mixed solution 97, is separated into a solid which includes the pulp fibers and the superabsorbent polymers and a liquid which includes the superabsorbent polymers and the acidic aqueous solution by a drum screen. Further, together with the separation, the superabsorbent polymers within the solid are applied with pressure and are crushed. The crushing may be exemplified by crushing the superabsorbent polymers in a gel state with a pressure which is or greater than the gel strength. As a result, the acidic aqueous solution which includes the superabsorbent polymers is separated from the mixed solution 97 by passing through the drum screen and is delivered from the third separation device 18. On the other hand, the pulp fibers in which the superabsorbent polymers are crushed among the mixed solution 97 cannot pass through the drum screen, and are delivered to the outside of the third separation device 18 from the gap of the lid body at the tip portion of the drum screen (the mixed matter 98). As the pressure which is applied to the lid body, for example, 0.02 MPa or more and 0.5 MPa or less is preferable. When the pressure is set to less than 0.02 MPa, it is difficult to crush the superabsorbent polymers, whereby the time for the oxidizing agent treatment cannot be shortened so much, and when the pressure is set to more than 0.5 MPa, although the superabsorbent polymers can be sufficiently crushed, there is a risk of damaging the pulp fibers.

The oxidizing agent treatment process S19 is performed by the oxidizing agent treatment device 19. The pulp fibers and the crushed superabsorbent polymers in the solid delivered from the third separation device 18 are treated by an aqueous solution which includes an oxidizing agent. Accordingly, the superabsorbent polymers are subjected to an oxidative decomposition so as to be removed from the pulp fibers. As a result, the superabsorbent polymers which have been attached to the pulp fibers in the mixed matter 98 (for example: which have been remained on the surface of the pulp fibers) are subjected to the oxidative decomposition by an aqueous solution (the treatment solution) which includes an oxidizing agent (for example: ozone), and change into an organic matter with low molecular weight which is soluble in an aqueous solution, whereby are removed from the pulp fibers. The state in which the superabsorbent polymers are subjected to an oxidative decomposition and are changed into an organic matter with low molecular weight which is soluble in an aqueous solution is referred to a state in which the superabsorbent polymers pass through a screen of 2 mm. Accordingly, impurities such as the superabsorbent polymers, etc., included in the pulp fibers are removed, pulp fibers with high purity can be produced, and sterilization, bleaching, and deodorization of the pulp fibers can be performed by the oxidizing agent treatment.

For example, in the oxidizing agent treatment device 19, the mixed matter 98 is thrown from the upper portion of the treatment tank and the treatment solution, that is, the aqueous solution which includes the oxidizing agent sinks from the upper portion toward the lower portion. On the other hand, the ozone containing gas is continuously released from the nozzle of the treatment tank into the treatment solution in a state of fine bubbles (for example: microbubbles or nanobubbles). That is, the ozone containing gas rises from the lower portion to the upper portion of the treatment solution. Inside the treatment solution, the sinking pulp fibers and the rising ozone containing gas collide while traveling with facing each other. Further, the ozone containing gas is attached to the surface of the pulp fibers so as to wrap the pulp fibers. At this time, the ozone in the ozone containing gas reacts with the superabsorbent polymers in the pulp fibers, performs oxidative decomposition for the superabsorbent polymers, and let the superabsorbent polymers dissolve in the treatment solution. Accordingly, the superabsorbent polymers which are included in the pulp fibers in the mixed matter 98 are subjected to the oxidative decomposition, so as to be removed from the pulp fibers.

The fourth separation process S20 is performed by the fourth separation device 20, and the treatment solution which includes the pulp fibers that have been treated by the oxidizing agent treatment device 19, that is, the mixed solution 99, passes through a screen with a plurality of slits, whereby the pulp fibers and the treatment solution are separated from the mixed solution 99. As a result, the treatment solution 104 passes through the screen so as to be separated from the mixed solution 99, and is delivered from the fourth separation device 20. The separated treatment solution 104, that is, the oxidizing agent treatment solution, may be returned to the oxidizing agent treatment device 19 and may be reused. Accordingly, the cost of the oxidizing agent treatment solution can be reduced. On the other hand, the pulp fibers among the mixed solution 99 cannot pass through the screen and remain in fourth separation device 20 or is delivered through another route. The aforementioned processes can be regarded as a process of separating and recovering the pulp fibers, and thus a process of producing recycled pulp fibers.

The present method (the system) includes, as described above, in the recovery process of recovering pulp fibers, etc., (the second separation process S17 (the second separation device 17) to the fourth separation process S20 (the fourth separation device 20)), at least the third separation process S18 (the third separation device 18) and the oxidizing agent treatment process S19 (the oxidizing agent treatment device 19). Accordingly, by crushing the superabsorbent polymers in a substantially spherical or a massive state, the surface area of the superabsorbent polymers can be largely enlarged, and the exposed portion of the superabsorbent polymers can be increased, by for example the inner side portion of the superabsorbent polymers being exposed to the outer side. Accordingly, in the oxidizing agent treatment process S19 (the oxidizing agent treatment device 19), the contact area in the superabsorbent polymers with the oxidizing agent can be increased, by for example letting the inner side portion of the superabsorbent polymers which has been difficult to come into contact with the oxidizing agent in a case of the superabsorbent polymers in a substantially spherical or a massive state, come into contact with the oxidizing agent. Therefore, the oxidative decomposition of the superabsorbent polymers can be even more efficiently proceeded, and the time for oxidizing agent treatment can be shortened. Thus, the efficiency of the treatment of removing the superabsorbent polymers from the pulp fibers can be improved.

The crushing process is preferably performed in a batch process. The collection bag A and the acidic aqueous solution B for one batch within the solution tank V (Va) are withdrawn from the solution tank V (Va) through the crushing portion 60 by the pump 63. At this time, the used absorbent articles are crushed together with the collection bag A by the crushing portion 60 during the procedure. In such a case, the in-solution crushing process and the withdrawal process are performed instantly in a continuous and a simultaneous manner.

Incidentally, this method preferably includes the ozone treatment process S22 and the pH adjustment process S23. These processes are for the purpose of regenerating and reusing the acidic aqueous solution which is used in this method. By reusing the acidic aqueous solution, the cost of the acidic aqueous solution can be reduced. The ozone treatment process S22 performs the sterilization treatment for the acidic aqueous solution 101 in which the superabsorbent polymers are further separated from the superabsorbent polymers and the acidic aqueous solution which are separated by the second separation process S17, by an ozone containing aqueous solution. The pH adjustment process S23 adjusts pH of the acidic aqueous solution 102 which has been performed with the sterilization treatment by the ozone containing aqueous solution, so as to produce the regenerated acidic aqueous solution 103. The acidic aqueous solution 103 is, for example, supplied to the crushing device 12, and may be supplied to other processes (devices) in need of the acidic aqueous solution if necessary. The surplus of the acidic aqueous solution 103 is stored in the water storage tank 24.

The above-mentioned method of recovering pulp fibers from a used absorbent article which includes pulp fibers and superabsorbent polymers includes, in the crushing process of crushing the used absorbent article (the hole punching process S11 (the rupturing device 11) to the first separation process S13 (the first separation device 13)), at least the hole punching process S11 (the rupturing device 11) and the crushing process S12 (the crushing device 12). Further, in the hole punching process S11 (the rupturing device 11), by punching a hole in the collection bag, the inactivation aqueous solution (for example: an acidic aqueous solution) is introduced into the collection bag from the hole, so as to inactivate the superabsorbent polymers which are included in the used absorbent articles by the inactivation aqueous solution, and the collection bag is substantially sunk under the water surface of the inactivation aqueous solution. Subsequently, in the crushing process S12 (the crushing device 12), while discharging the collection bag which has sunk under the water surface of the inactivation aqueous solution together with the inactivation aqueous solution from the solution tank, the used absorbent articles are crushed together with the collection bag within the inactivation aqueous solution. Accordingly, the used absorbent articles in a state of being placed in the collection bag are crushed together with the collection bag within the inactivation aqueous solution, whereby dirt and fungi are hardly mixed into the inactivation aqueous solution and odor is hardly produced at least until the initiation of the crushing. Further, even if dirt and fungi are mixed into the inactivation aqueous solution and odor is produced when the used absorbent articles are crushed, at almost the same time as the crushing, the inactivation aqueous solution into which the dirt and fungi are mixed is delivered from the solution tank together with the crushed matter, whereby the inactivation aqueous solution can be washed away with the dirt and fungi hardly remaining in the solution tank. In addition, since odor can be sealed by the inactivation aqueous solution, the production of odor can also be suppressed to a lower degree. Accordingly, when crushing used absorbent articles, dirt and fungi can be suppressed from being scattered and odor accompanied therewith can be suppressed from being released. That is, used absorbent articles can be crushed hygienically and safely, and the cost of hygiene management during processing or maintenance can be suppressed.

As a preferred aspect of the present embodiment, the process of punching a hole in the collection bag in the hole punching process S11 and the process of crushing the used absorbent articles together with the collection bag in the crushing process S12 may be performed at different positions.

According to the present method, the process of punching a hole in the collection bag (the rupturing device 11) and the process of crushing the used absorbent articles together with the collection bag (the crushing device 12) are performed at different separate portions or positions (devices). Accordingly, the inactivation aqueous solution is introduced into the collection bag from the hole and the collection bag is reliably sunk under the water surface of the inactivation aqueous solution, and thereafter, the crushing can be performed at a different portion or position. Therefore, at the time of crushing, a situation can be suppressed in which a portion of the collection bag is exposed above the water surface of the inactivation aqueous solution, an opening (a rupture) of the hole is exposed above the water surface of the inactivation aqueous solution, and dirt and fungi of the used diapers are scattered and odor accompanied therewith is released.

As a preferred aspect of the present embodiment, the crushing process S12 (the crushing device 12) may include the in-solution crushing process (the crushing portion 60) of crushing the used absorbent articles inside the collection bag together with the collection bag within the inactivation aqueous solution, and the withdrawal process (the pump 63) of withdrawing the crushed matter which is obtained by the in-solution crushing process (the crushing portion 60) together with the inactivation aqueous solution from the in-solution crushing process (the crushing portion 60).

According to the present method, the mixed solution 92 of the crushed matter and the inactivation aqueous solution is actively withdrawn from the in-solution crushing process (the crushing portion 60), whereby in accordance with the movement of the mixed solution 92, dirt of the equipment in relation to the in-solution crushing process (the crushing portion 60) can be removed (washed away) by the inactivation aqueous solution. Accordingly, the hygiene state can be preferably maintained in the crushing process (the crushing device 12).

In the vertical direction, the crushing portion is preferably present lower in comparison to the solution tank. Accordingly, by also using the gravity, the mixed solution 92 can be actively withdrawn from the in-solution crushing process (the crushing portion 60). Therefore, in accordance with the movement of the mixed solution 92, dirt of the equipment in relation to the in-solution crushing process (the crushing portion 60) can be removed (washed away) by the inactivation aqueous solution in a more reliable manner.

As a preferred aspect of the present embodiment, the crushing process S12 (the crushing device 12) may include a process of crushing the used absorbent articles together with the collection bag so that an average value of the size of the crushed matter is 50 mm or larger and 100 mm or smaller.

According to the present method, in the crushing process S12 (the crushing device 12), the used absorbent articles are crushed so that the average value of the size of the crushed matter is 50 mm or larger and 100 mm or smaller by the adjustment of the crushing device 12. In such a case, a slit can be reliably provided in the back sheet and/or the top sheet of each of the used absorbent articles, whereby substantially all pulp fibers can be extracted from the slit in each of the used absorbent articles. Accordingly, the recovery rates of the pulp fibers and the superabsorbent polymers can be improved. It should be noted however that when the average value of the size is set to less than 50 mm, materials other than the pulp fibers and the superabsorbent polymers (for example: films, nonwoven fabric, elastic bodies, etc.) are cut into too small sizes, whereby it is difficult for such materials to be separated from the pulp fibers and the superabsorbent polymers. As a result, such materials which are mixed into the regenerated pulp fibers and the superabsorbent polymers increase, and the recovery rate of the pulp fibers is to be reduced. On the other hand, when the average value of the size is set to be larger than 100 mm, it is difficult to apply a slit in the used absorbent articles. As a result, used absorbent articles from which pulp fibers and the superabsorbent polymers cannot be extracted occur, and the recovery rates of the pulp fibers and the superabsorbent polymers are to be reduced.

As a preferred aspect of the present embodiment, the process of crushing the used absorbent articles together with the collection bag within the inactivation aqueous solution in the crushing process S12 (the crushing device 12) may be performed by a biaxial crushing device (the crushing portion 60 may include the biaxial crushing device).

According to the present method, the process of crushing the used absorbent articles is performed by using a biaxial crushing device (the crushing portion 60 includes the biaxial crushing device). The biaxial crushing device may be exemplified by a biaxial rotation-type crushing machine, a biaxial differential-type crushing machine, and a biaxial shear-type crushing machine. Accordingly, the size of the crushed matter can be made roughly within the predetermined range. Therefore, a situation can be suppressed in which the crushed matter is too small and foreign matter is mixed into pulp fibers, or the crushed matter is too large and used absorbent articles from which pulp fibers cannot be extracted occur, whereby the recovery rate of pulp fibers are reduced.

As another embodiment, the process of punching the hole in the surface of the collection bag which comes into contact with the inactivation aqueous solution (the hole punching portion 50) in the hole punching process S11 (the rupturing device 11) may be performed by a protrusion (the rupturing blade 41 of the rupturing portion 40) which is movable upward and downward in the solution tank V while rotating around a rotation axis.

According to the present method, a hole is punched in the collection bag by a protrusion (the rupturing blade 41) which moves upward and downward in the solution tank while rotating around a rotation axis. Accordingly, without having to let the collection bag sink within the inactivation aqueous solution, for example by letting the protrusion move to the upper portion of the solution tank so as to come into contact with the collection bag, a hole can be reliably punched in the collection bag. After punching a hole in the collection bag, the collection bag is sunk within the inactivation aqueous solution, whereby the collection bag can be reliably sunk within the acidic solution in a short amount of time, the processing time can be shortened, and the processing efficiency can be improved.

As a preferred aspect of the present embodiment or as another embodiment, the process of punching the hole in the surface of the collection bag which comes into contact with the inactivation aqueous solution (the hole punching portion 50 or the hole punching portion 50a) in the hole punching process S11 (the rupturing device 11) may be performed by delivering the collection bag into the inactivation aqueous solution from the upper portion of the solution tank Va and let the collection bag come into contact with the protrusion (the rupturing blade 41 of the rupturing portion 40, the protrusion portion 44 of the rotation rotor 41a of the rupturing portion 40a) which is arranged at a lower portion of the solution tank Va and rotates around a rotation axis.

According to the present method, the collection bag is delivered into the inactivation aqueous solution, and a hole is punched in the collection bag by the protrusion (the rupturing blade 41 of the rupturing portion 40, the protrusion portion 44 of the rotation rotor 41a of the rupturing portion 40a) in the lower portion of the solution tank Va. After letting the collection bag sink within the inactivation aqueous solution, a hole is punched in the collection bag, whereby dirt and odor can be reliably prevented from spreading to the outside from the used absorbent articles inside the collection bag. Accordingly, the used absorbent articles can be crushed hygienically and safely.

As a preferred aspect of the present embodiment, the inactivation aqueous solution is an acidic aqueous solution.

According to the present method, the inactivation aqueous solution is an acidic aqueous solution, whereby the superabsorbent polymers in the used absorbent articles can be reliably dehydrated and inactivated. Especially, when the crushing is performed within an acidic aqueous solution, alkaline volatile components which derive from excrement such as urine, etc., remain within the acidic aqueous solution without volatilizing, whereby production of odor by alkaline gas such as ammonia, etc., can be suppressed. Accordingly, in the crushing process S12 (the crushing device 12), the crushing can be performed easily without the used absorbent articles being greatly inflated, whereby the processing efficiency can be improved.

As a preferred aspect of the present embodiment, the acidic aqueous solution includes a citric acid.

According to the present method, the acidic aqueous solution includes a citric acid (by for example: a concentration of 0.5 to 2.0 mass %), whereby the superabsorbent polymers in the used absorbent articles can be dehydrated and inactivated, and further, there is hardly a negative influence to the workers by acid, and corrosion of equipment in each process by acid can be suppressed.

Second Embodiment

The second embodiment is explained. Hereinbelow, the difference from the first embodiment is mainly explained. Note that also in the present embodiment, a case in which an acidic aqueous solution is used as the inactivation aqueous solution is explained.

The system 1 which is used for the method of recovering pulp fibers from a used absorbent article is explained. FIG. 6 is a block diagram which shows one example of the system 1 according to the present embodiment. The system 1 according to the present embodiment includes a container (which is not shown), the crushing device 12, and the first separation device 13, and preferably includes the first dust removal device 14, the second dust removal device 15, the third dust removal device 16, the second separation device 17, the third separation device 18, the oxidizing agent treatment device 19, and the fourth separation device 20. Hereinbelow, explanations are given in detail.

In the present embodiment, the container (which is not shown), the crushing device 12, and the first separation device 13 are integrated into a single device so as to configure the crushing separation device 10. That is, the system 1 includes the crushing separation device 10. The container is the one which houses the collection bag A that encloses the used absorbent articles. The crushing device 12 is connected to the container, and while the collection bag A inside the container is transferred, the used absorbent articles inside the collection bag A are crushed together with the collection bag A within the acidic aqueous solution B. The first separation device 13 separates the pulp fibers, the superabsorbent polymers and the inactivation aqueous solution from the crushed matter and the acidic aqueous solution B obtained by the crushing device 12.

Figure 7:
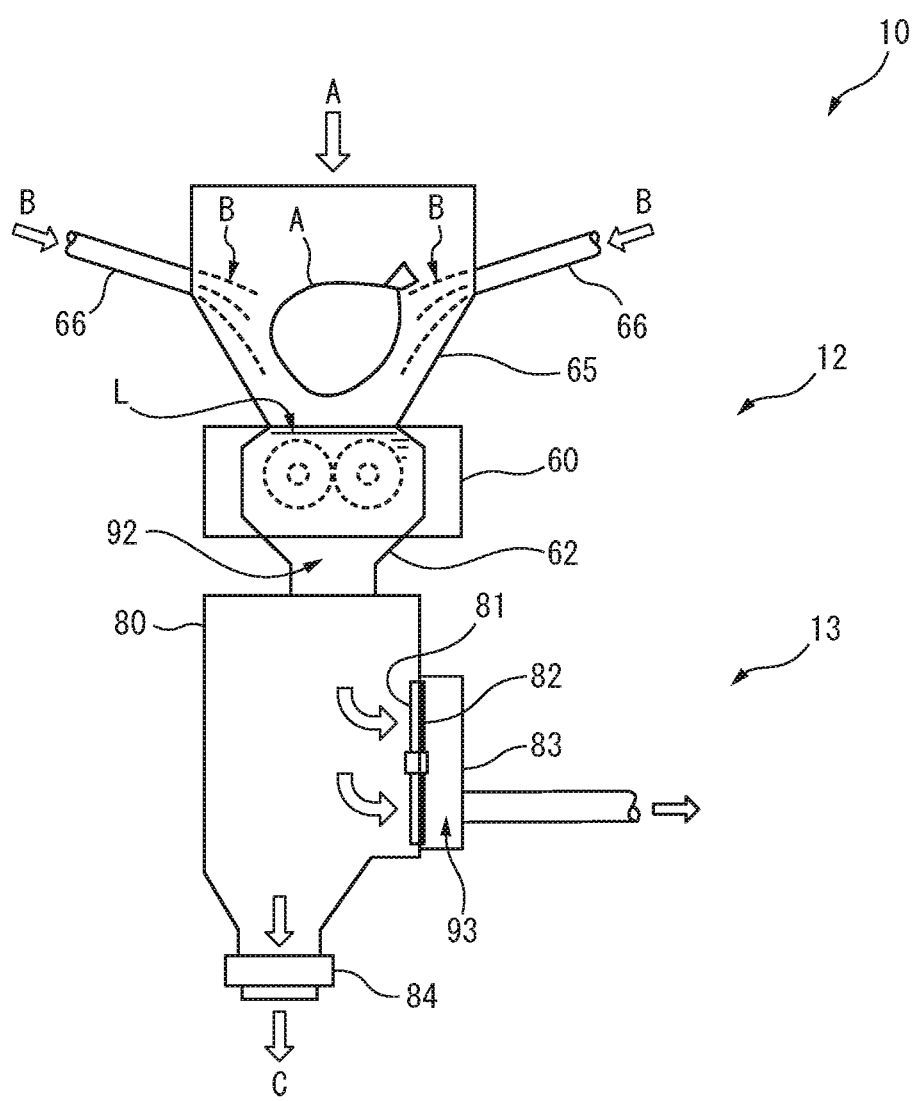
FIG. 7 is a schematic view which shows a configurational example of the crushing separation device of FIG. 6.

FIG. 7 is a schematic view which shows the configurational example of the crushing separation device 10 (the container+the crushing device 12+the first separation device 13) of FIG. 6. The container 65 is attached to the upper portion of the crushing device 12, the upper side of which is released or an openable lid is arranged, and the collection bag A can be thrown inside from the upper side. Further, the pipe 66 which includes a valve (which is not shown) is joined to the side surface of the container 65, and the acidic aqueous solution B (or the regenerated acidic aqueous solution 103 is also acceptable) may be supplied from the pipe 66. Still further, the lower side of the container 65 is connected to the upper side of the crushing device 12, the acidic aqueous solution B which has been supplied through the pipe 66 is let to be transmitted on the inner wall surface so as to be supplied to the crushing device 12, and the collection bag A inside may be supplied to the crushing device 12. The container 65 may be regarded as an aspect in which the acidic aqueous solution B is not always stored in the solution tank V of the first embodiment.

In the crushing device 12, the acidic aqueous solution B is stored so as to fill the inner portion of the crushing portion 60 (refer to FIG. 4), for example, so as to cover the rotation axes 72 of the crushing portion 60, the spacer 73 and the rotation blade 74. The liquid surface is at least at the upper end position of the rotation blade 74, and is preferably at the position of the boundary between the container 65 and the crushing device 12. The height of the liquid surface may be measured for example by a level gauge. When the collection bag A reaches the bottom portion of the container 65 and at least a portion of the collection bags A is supplied into the acidic aqueous solution B inside the crushing device 12, by the rotation of each of the rotation blade 74 and the spacer 73 of the pair of rotation axes 72, 72 of the crushing portion 60, the collection bag A is withdrawn into the crushing portion 60. Accordingly, the crushing device 12 crushes the used absorbent articles inside the collection bag A together with the collection bag A within the acidic aqueous solution B. The crushing device 12 is connected to the first separation device 13 which is arranged directly under (the crushing portion 60 of) the crushing device 12 through the pipe 62. The crushing device 12 delivers the crushed matter obtained by the crushing portion 60 together with the acidic aqueous solution B (the mixed solution 92), and supplies the same to the first separation device 13 through the pipe 62. Incidentally, the acidic aqueous solution B which runs short in the delivery of the mixed solution 92 may be replenished from the container 65, from the pipe (which is not shown) which is directly connected to the crushing device 12, or from the first separation device 13.

The first separation device 13 is filled with the acidic aqueous solution B, and the mixed solution 92 which includes the crushed matter obtained by the crushing device 12 and the acidic aqueous solution B is stirred, whereby the pulp fibers, the superabsorbent polymers and the acidic aqueous solution are separated from the mixed solution 92 (the mixed solution 93), so as to be delivered to the first dust removal device 14. To be specific, the first separation device 13 includes the container 80, the impeller 81, the screen plate 82, the side room 83, and the lower surface valve 84. The container 80 stores the mixed solution 92. The impeller 81 stirs the mixed solution 92 and guides the same to the direction of the screen plate 82. The screen plate 82 is a screen which has a plurality of openings. The size of each of the plurality of openings is a size so that it is easy for the pulp fibers and the superabsorbent polymers among the crushed matter in the mixed solution 92 to pass through and it is difficult for the other materials to pass through. To the side room 83, the acidic aqueous solution (the mixed solution 93) which includes the pulp fibers and the superabsorbent polymers that have passed through the screen plate 82 is delivered. The lower surface valve 84 is opened when the other materials (the foreign matter) which could not pass through the screen plate 82 accumulated inside the container 80 are extracted. As the first separation device 13, a Pack Pulper (manufactured by Satomi Corporation), may be mentioned.

Figure 8:
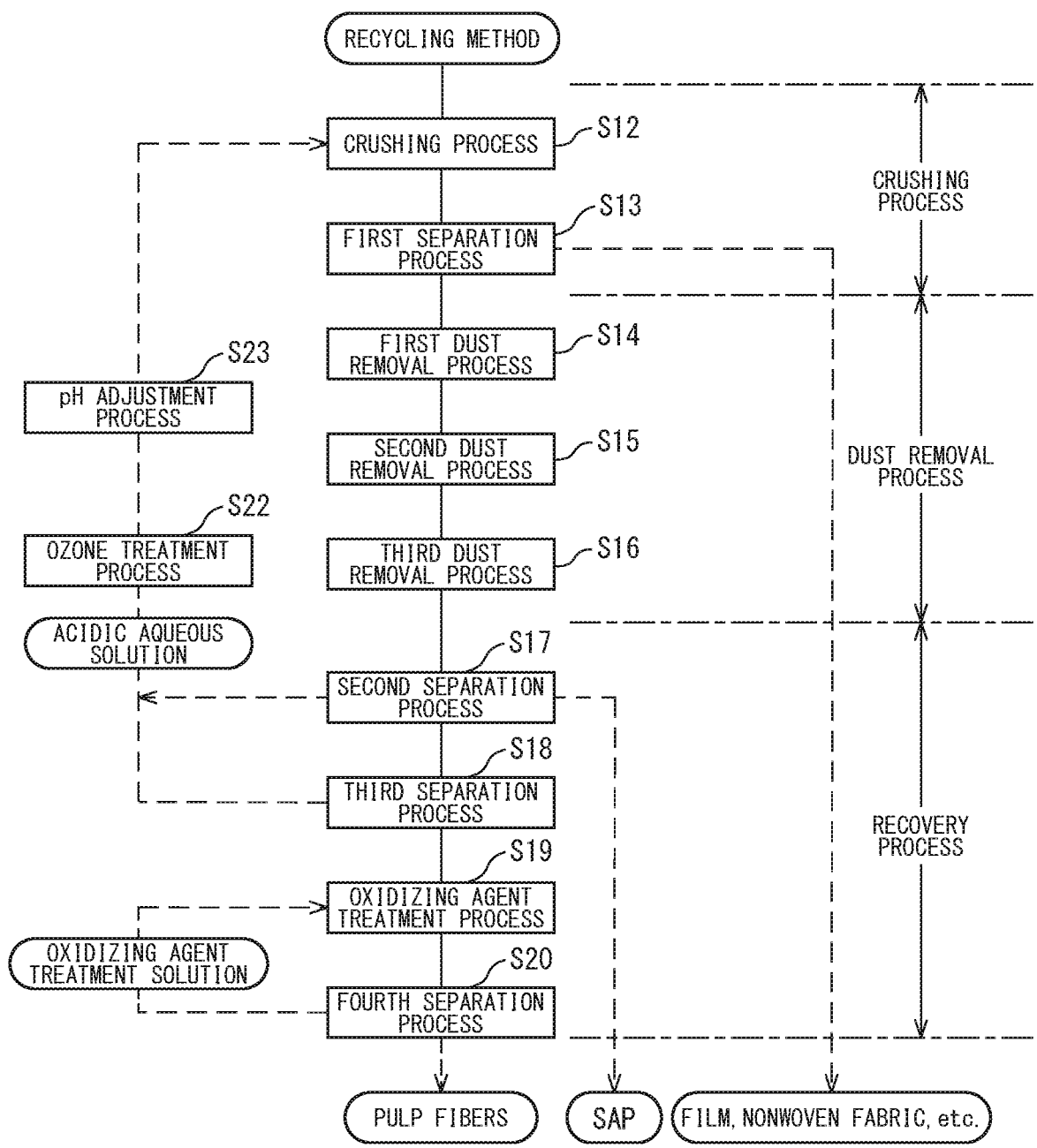
FIG. 8 is a flowchart which shows another example of the method according to an embodiment.

Next, the method of recovering the pulp fibers from a used absorbent article is explained. This method is a method which recovers pulp fibers (and preferably further recovers superabsorbent polymers) from a used absorbent article, and thus is a method which produces recycled pulp fibers (and preferably further produces recycled superabsorbent polymers). FIG. 8 is a flow chart which shows one example of the method according to the present embodiment. This method includes the crushing process S12 and the first separation process S13, and preferably includes the first dust removal process S14, the second dust removal process S15, the third dust removal process S16, the second separation process S17, the third separation process S18, the oxidizing agent treatment process S19, and the fourth separation process S20. Hereinbelow, explanations are given in detail.

The method according to the present embodiment can be regarded as the method in which the hole punching process S1 is excluded in the method according to the first embodiment.

The crushing process S12 is performed by the container 65 of the crushing separation device 10 and the crushing device 12. In the container 65, the acidic aqueous solution B is supplied through the pipe 66 when required so as to let the height of the liquid surface of the acidic aqueous solution B be the predetermined height, and while removing dirt on the inner wall surface by transmitting on the inner wall surface, the acidic aqueous solution B is supplied to the crushing device 12.

The collection bag A is housed in the container 65, reaches the bottom portion of the container 65, and at least a portion of the collection bags A is supplied into the acidic aqueous solution B inside the crushing device 12. Further, by the rotation of each of the rotation blade 74 and the spacer 73 of the pair of rotation axes 72, 72 of the crushing portion 60, the collection bag A is withdrawn into the acidic aqueous solution B inside the crushing portion 60. As a result, the used absorbent articles inside the collection bag A are crushed together with the collection bag A within the acidic aqueous solution B by the crushing portion 60. Incidentally, also in the present embodiment, it is preferable that the average value of the size of the crushed matter is 50 mm or larger and 100 mm or smaller.

The mixed solution 92 which includes the crushed matter that is delivered from the crushing portion 60 and the acidic aqueous solution B is delivered to the first separation device 13 which is arranged directly under (the crushing portion 60 of) the crushing device 12 through the pipe 62.

The first separation process S13 is performed by the first separation device 13 of the crushing separation device 10. The container 80 of the first separation device 13 is filled with the acidic aqueous solution B by the supply of the acidic aqueous solution B (which includes the mixed solution 92) from the crushing device 12.

The mixed solution 92 which includes the crushed matter and the acidic aqueous solution B is stirred by the impeller 81 inside the container 80, and while the washing of removing dirt from the crushed matter is performed, the mixed solution 92 is guided to the direction of the screen plate 82. Further, the mixed solution 92 is separated into the pulp fibers, the superabsorbent polymers and the acidic aqueous solution, and into the other materials by the screen plate 82. That is, among the crushed matter in the mixed solution 92, the pulp fibers and the superabsorbent polymers pass through the screen plate 82 so as to reach the side room 83 to be separated, and the other materials do not pass through the screen plate 82 so as to remain inside the container 80. The pulp fibers, the superabsorbent polymers and the acidic aqueous solution B (the mixed solution 93) which have reached the side room 83 are delivered to the first dust removal device 14 through a pipe. Note that a portion of the other materials cannot be completely separated and is delivered together with the mixed solution 93. As the size of the openings of the screen of the first separation device 13, 5 mm to 20 mmϕ in a case of round openings may be mentioned, and in a case of holes with other shapes, a size with substantially the same area as the round hole may be mentioned.

According to the present system and method, at least after the collection bag A is received by the container 65, while transferring the collection bag A to the crushing device 12 which is provided separately from the container 65, in the crushing device 12, the used absorbent article is crushed together with the collection bag A while inactivating the superabsorbent polymers of the used absorbent article inside the collection bag A, within the acidic aqueous solution B (the inactivation aqueous solution). That is, when used absorbent articles are crushed, the used absorbent articles are crushed inside the crushing device 12 which is separate from the container 65, within the acidic aqueous solution B, and after the crushing, the acidic aqueous solution B and the crushed matter are transferred to the first separation device 13. Accordingly, even when dirt or fungi is mixed into the acidic aqueous solution B, or odor is produced, the acidic aqueous solution B and the crushed matter into which dirt or fungi is mixed hardly reach the container 65. Therefore, the crushing can be performed without dirt or fungi hardly remaining in the container. In addition, since odor can be sealed by the acidic aqueous solution B, the production of odor can also be suppressed to a lower degree. Especially, when the crushing is performed within the acidic aqueous solution B, alkaline volatile components which derive from excrement such as urine, etc., remain within the acidic aqueous solution B without volatilizing, whereby production of odor by alkaline gas such as ammonia, etc., can be suppressed. Accordingly, when crushing used absorbent articles, dirt and fungi can be suppressed from being scattered and odor accompanied therewith can be suppressed from being released. That is, used absorbent articles can be crushed hygienically and safely, and the cost of hygiene management during processing or maintenance can be suppressed.

EXAMPLES

Hereinbelow, examples of the above-mentioned method of recovering pulp fibers from used absorbent articles are explained.

In the present example, the hole punching process S11, the crushing process S12, and the first separation process S13 in the method according to the above-mentioned first embodiment were performed for an absorbent article, and the relationship between the crushing method and the mixed amount of other materials (the foreign matter) was investigated. To be specific, as the absorbent article, a disposable diaper for adults (which is not yet used) was used. In the crushing process S12, the disposable diapers when the crushing device 12 was adjusted so that the average value of the size of the crushed matter was 25 mm, 50 mm, and 100 mm, respectively, were regarded as examples 1 to 3. On the other hand, the disposable diaper in which the crushing process S12 was not performed was regarded as the comparative example.

Figure 9:
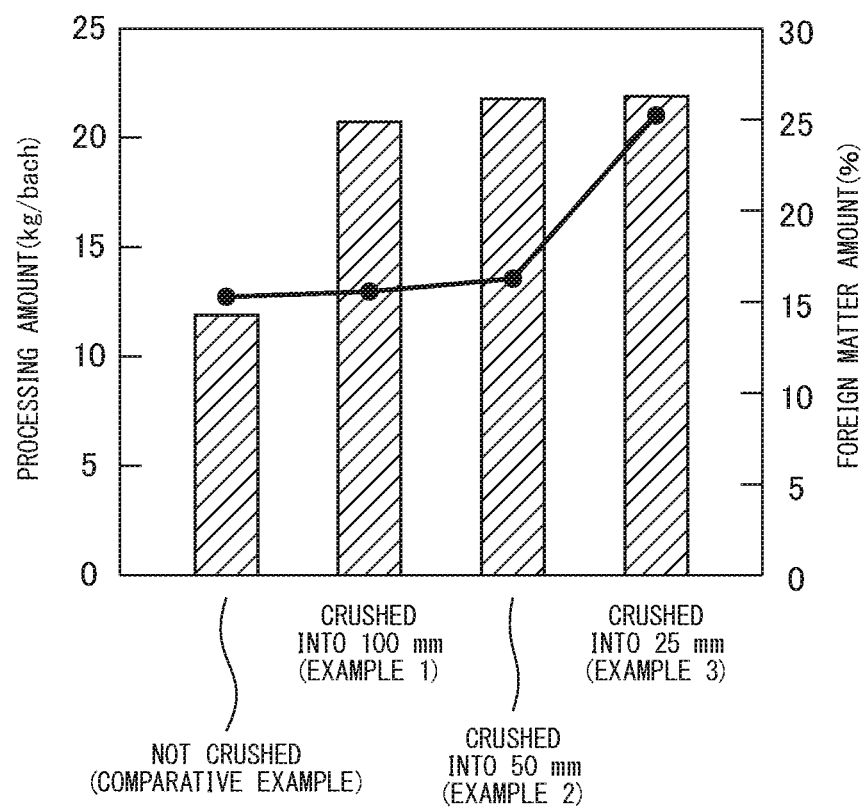
FIG. 9 is a graph which shows the relationship between the size of the crushed matter in the crushing process and the processing amount and the foreign matter amount.

The results of the investigation of the relationship between the crushing method and the mixed amount of other materials are shown in FIG. 9. FIG. 9 is a graph which shows the relationship between the size of the crushed matter in the crushing process and the processing amount and the foreign matter amount. The bar graph (the vertical axis is the axis on the left side) shows the processing amount (kg) per one batch, and shows the amount of the disposable diapers which can be processed by the first separation device 13 of the first separation process S13. The line graph (the vertical axis is the axis on the right side) shows the ratio (%) of foreign matter (other materials) other than the pulp fibers and the superabsorbent polymers included in the mixed solution 93 after the first separation process S13 (the acidic aqueous solution which includes the separated pulp fibers and superabsorbent polymers).

In the case in which the crushing was not performed (the comparative example), the disposable diapers were processed by the first separation process S13 as they were. Accordingly, as shown, the disposable diapers are large and bulky, and it is difficult for the joining of the top sheet and the back sheet to be detached, etc., whereby the amount (the processing amount) of disposable diapers which can be processed by the first separation device 13, that is, the amount (the processing amount) of disposable diapers from which the pulp fibers and the superabsorbent polymers can be extracted was small. Note that since the crushing is not performed, the size of each material was large, and the foreign matter amount included in the mixed solution 93 after the first separation process S13 was small.

On the other hand, in the case in which the crushing was performed (the examples), the disposable diapers were not bulky, and the amount (the processing amount) of disposable diapers which can be processed by the first separation device 13 was larger. Note that each of the materials were made smaller by the crushing, whereby the foreign matter amount included in the mixed solution 93 after the first separation process S13 was larger.

Accordingly, it was understood that it was preferable to perform the crushing than not performing the crushing from the viewpoint of the processing amount. Further, in a case in which the viewpoint of the foreign matter amount is also taken into consideration, it was understood that it is preferable to set the average value of the size of the crushed matter so as to be 50 mm or larger and 100 mm or smaller.

The above-mentioned embodiment explains a case in which the configurational member of the back sheet is a film, and the configurational member of the top sheet is a nonwoven fabric. However, an embodiment in a case in which the configurational member of the back sheet is a nonwoven fabric, and the configurational member of the top sheet is a film, or a case in which both of the configurational members of the back sheet and the top sheet are films, can also be realized by the similar method as the above-mentioned embodiment, and can exhibit the similar effect.

The absorbent article of the present invention is not limited to the above-described each of the embodiments, and it is possible to appropriately combine with or change to the techniques of each of the embodiments or other techniques, within a range which does not deviate from the purpose and the spirit of the present invention, and does not cause technical inconsistency.

REFERENCE SIGNS LIST

A collection bag
V solution tank
S11 hole punching process
S12 crushing process
S13 first separation process

The invention claimed is:

1. A method of recovering pulp fibers from a used absorbent article which includes pulp fibers and superabsorbent polymers, the method comprising:
   a reception process of putting a collection bag enclosing the used absorbent article into a container;
   a crushing process of, while transferring the collection bag from inside the container to a crushing device which is located below, separated from and connected to the container, crushing the used absorbent article inside the collection bag together with the collection bag within an inactivation aqueous solution by the crushing device; and
   a separation process of separating the pulp fibers, superabsorbent polymers, and the inactivation aqueous solution by a separation device from crushed matter and the inactivation aqueous solution which are obtained by the crushing process, wherein
   the reception process includes a hole punching process of punching a hole in a surface of the collection bag which comes into contact with the inactivation aqueous solution, after putting the collection bag into a solution tank as the container in which the inactivation aqueous solution is stored, and
   the crushing process includes a process of, while transferring the collection bag with the hole, sunk under a water surface of the inactivation aqueous solution from the solution tank to the crushing device together with the inactivation aqueous solution, crushing the used absorbent article inside the collection bag together with the collection bag within the inactivation aqueous solution.

2. The method according to claim 1, wherein
the process of punching the hole in the collection bag in the hole punching process and the process of crushing the used absorbent article together with the collection bag in the crushing process are performed at different positions.

3. The method according to claim 1, wherein
the crushing process includes:
an in-solution crushing process of crushing the used absorbent article inside the collection bag together with the collection bag within the inactivation aqueous solution which is supplied together with the collection bag; and
a withdrawal process of withdrawing the crushed matter which is obtained by the in-solution crushing process together with the inactivation aqueous solution from the in-solution crushing process.

4. The method according to claim 1, wherein
the process of punching the hole in the surface of the collection bag which comes into contact with the inactivation aqueous solution in the hole punching process is performed by a protrusion which is capable of moving upward and downward in the solution tank while rotating around a rotation axis.

5. The method according to claim 1, wherein
the process of punching the hole in the surface of the collection bag which comes into contact with the inactivation aqueous solution in the hole punching process is performed by delivering the collection bag into the inactivation aqueous solution from an upper portion of the solution tank and letting the collection bag come into contact with a protrusion which is arranged at a lower portion of the solution tank and rotates around a rotation axis.

6. A method of recovering pulp fibers from a used absorbent article which includes pulp fibers and superabsorbent polymers, the method comprising:
   a reception process of putting a collection bag enclosing the used absorbent article into a container in which an inactivation aqueous solution is not stored;
   a crushing process of, while transferring the collection bag from inside the container to a crushing device which is located below, separated from and connected to the container and in which the inactivation aqueous solution is stored, crushing the used absorbent article inside the collection bag together with the collection bag within the inactivation aqueous solution by the crushing device; and a step of supplying crushed matter which are obtained by the crushing process together with the inactivation aqueous solution from the crushing device to a separation device, a separation process of separating the pulp fibers, superabsorbent polymers, and the inactivation aqueous solution by the separation device from the crushed matter and the inactivation aqueous solution, wherein the crushing process includes a process of, while supplying the collection bag into the inactivation aqueous solution inside the crushing device, crushing the used absorbent article inside the collection bag together with the collection bag within the inactivation aqueous solution.

7. The method according to claim 1 or 6, wherein the separation process includes a process of directly receiving the crushed matter and the inactivation aqueous solution by the separation device which is arranged directly under the crushing device.

8. The method according to claim 1 or 6, wherein the crushing process includes a process of crushing the used absorbent article together with the collection bag so that an average value of a size of the crushed matter is 50 mm or larger and 100 mm or smaller.

9. The method according to claim 1 or 6, wherein the process of crushing the used absorbent article together with the collection bag within the inactivation aqueous solution in the crushing process is performed by a biaxial crushing device.

10. The method according to claim 1 or 6, wherein the inactivation aqueous solution is an acidic aqueous solution.

11. The method according to claim 10, wherein the acidic aqueous solution includes a citric acid.

* * * * *